US011977790B2

(12) United States Patent
Fukui et al.

(10) Patent No.: US 11,977,790 B2
(45) Date of Patent: May 7, 2024

(54) STORAGE MEDIUM STORING COMPUTER-READABLE INSTRUCTIONS FOR INFORMATION PROCESSING DEVICE EDITING IMAGE DATA FOR CREATING COMPOSITE LABEL

(71) Applicant: BROTHER KOGYO KABUSHIKI KAISHA, Nagoya (JP)

(72) Inventors: Tomoyasu Fukui, Inuyama (JP); Ryuichi Kanda, Nagoya (JP); Koichi Kondo, Inuyama (JP); Hiromichi Nampo, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/670,869

(22) Filed: Feb. 14, 2022

(65) Prior Publication Data
US 2022/0261195 A1 Aug. 18, 2022

(30) Foreign Application Priority Data
Feb. 15, 2021 (JP) .................................. 2021-022061

(51) Int. Cl.
*G06F 3/12* (2006.01)
(52) U.S. Cl.
CPC .......... *G06F 3/1208* (2013.01); *G06F 3/1243* (2013.01); *G06F 3/1256* (2013.01); *G06F 3/1204* (2013.01)
(58) Field of Classification Search
CPC .... G06F 3/1208; G06F 3/1243; G06F 3/1256; G06F 3/1257; G06F 3/1285
USPC .......................................................... 358/1.6
See application file for complete search history.

(56) References Cited

U.S. PATENT DOCUMENTS

| | | | | |
|---|---|---|---|---|
| 2019/0023027 A1* | 1/2019 | Nakatake | ............. | G06K 15/024 |
| 2020/0409636 A1* | 12/2020 | Kako | .................... | G06F 3/1255 |

FOREIGN PATENT DOCUMENTS

| | | |
|---|---|---|
| JP | 2007-334649 A | 12/2007 |
| JP | 2010-017937 A | 1/2010 |
| WO | 2012/169263 A1 | 12/2012 |

* cited by examiner

*Primary Examiner* — Darryl V Dottin
(74) *Attorney, Agent, or Firm* — KENEALY VAIDYA LLP

(57) ABSTRACT

In an information processing device, a processor is configured to perform: acquiring; displaying; receiving; and identifying. The acquiring acquires from a memory a single set of template data for a composite label. The single set of template data includes a plurality of sets of image data corresponding to respective ones of a plurality of print labels and representing respective ones of a plurality of label images. The single composite label is to be created using the plurality of print labels. The displaying displays on a display a composite label image in which the plurality of label images is superimposed on each other. The receiving receives a designating operation on the composite label image via an operating interface. The designating operation targeting a target label image. The identifying identifies target image data corresponding to the target label image from among the plurality of sets of image data.

23 Claims, 23 Drawing Sheets

FIG. 4A
PRINT LABEL
LS — COMPOSITE LABEL
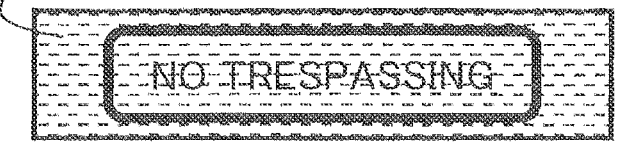
⬆ OVERLAY
FIRST-LAYER PRINT LABEL
(TOPMOST LAYER)
L1 —
SECOND-LAYER PRINT LABEL
L2 —
THIRD-LAYER PRINT LABEL
(BOTTOMMOST LAYER)
L3 —
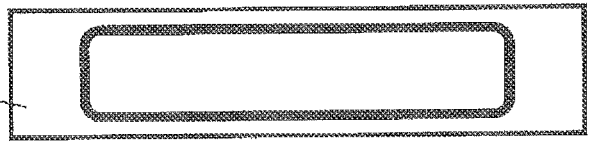

FIG. 4B

COMPOSITE LABEL TEMPLATE DATA

FIRST-LAYER LABEL DATA

FIRST LAYER

[CASSETTE DATA]
MEDIUM WIDTH: 24mm, MEDIUM COLOR: CLEAR,
PRINTING COLOR: BLUE

[OBJECT DATA]
OBJECT TYPE: TEXT, POSITION: X1, Y1
FONT: (POINT), (STYLE), (ORNAMENT)
TEXT: "NO TRESPASSING"

SECOND-LAYER LABEL DATA

SECOND LAYER

[CASSETTE DATA]
MEDIUM WIDTH: 24mm, MEDIUM COLOR: CLEAR,
PRINTING COLOR: RED

[OBJECT DATA]
OBJECT TYPE: GRAPHIC, POSITION: X2, Y2
STYLE: (HEIGHT), (WIDTH), (GRAPHIC TYPE)
GRAPHIC: SQUARE BORDER WITH ROUNDED CORNERS

THIRD-LAYER LABEL DATA

THIRD LAYER

[CASSETTE DATA]
MEDIUM WIDTH: 24mm, MEDIUM COLOR: ORANGE,
PRINTING COLOR: BLACK

[OBJECT DATA]
OBJECT TYPE: BACKGROUND FILL PATTERN
PATTERN: HORIZONTAL DASHES

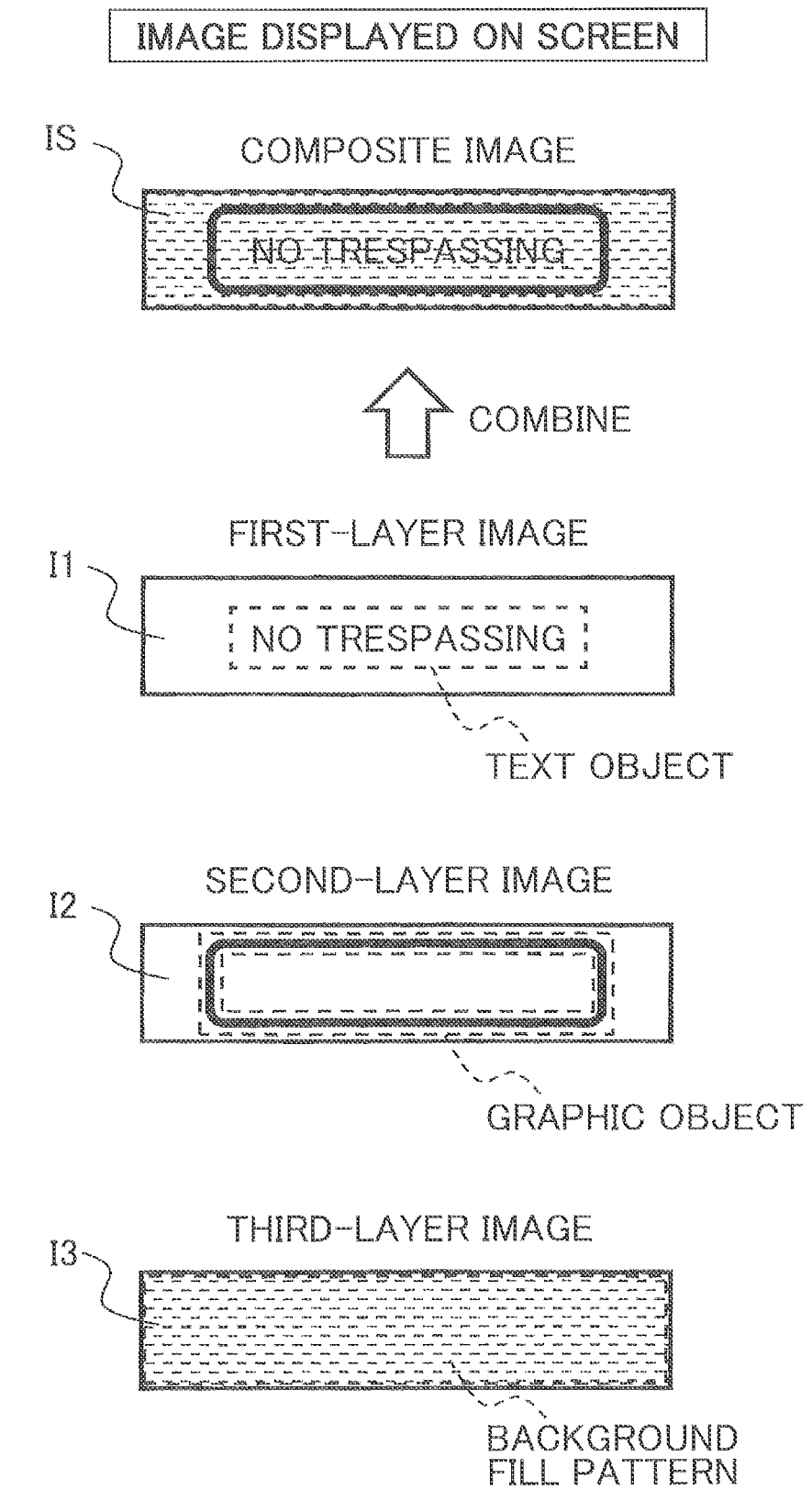

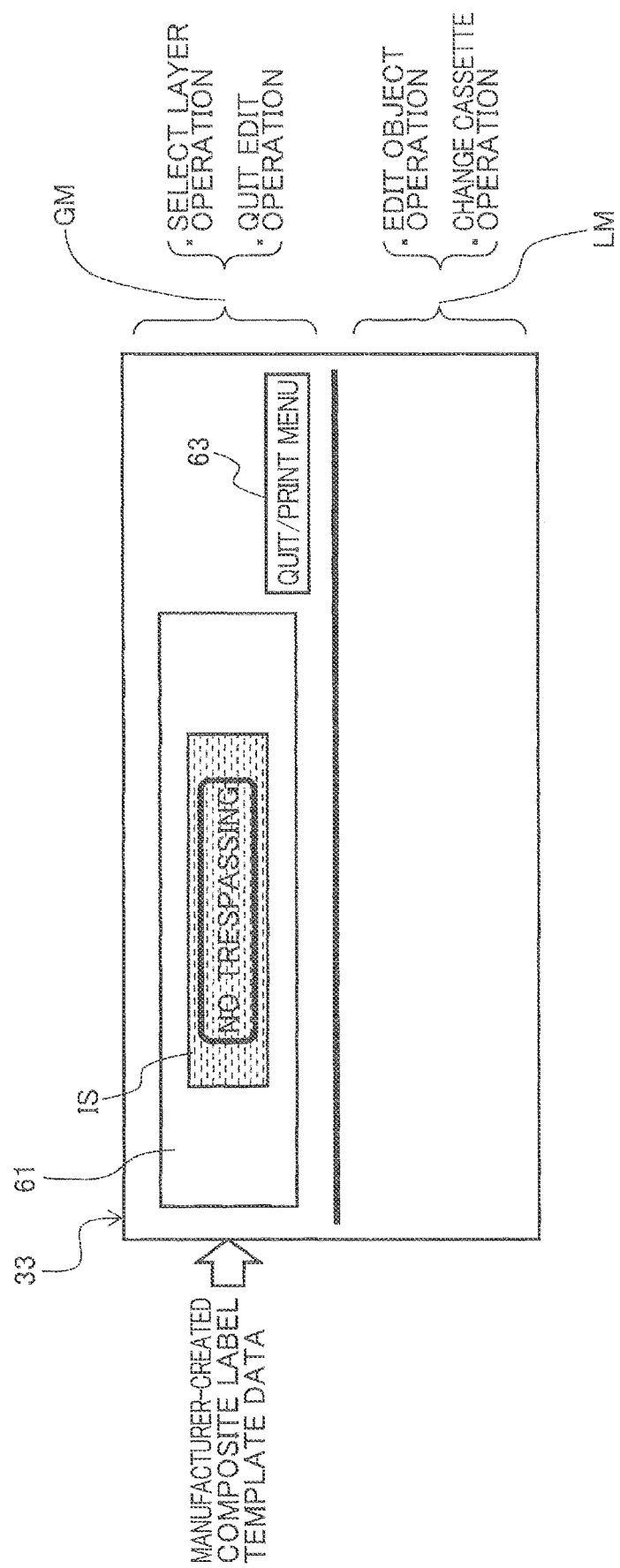

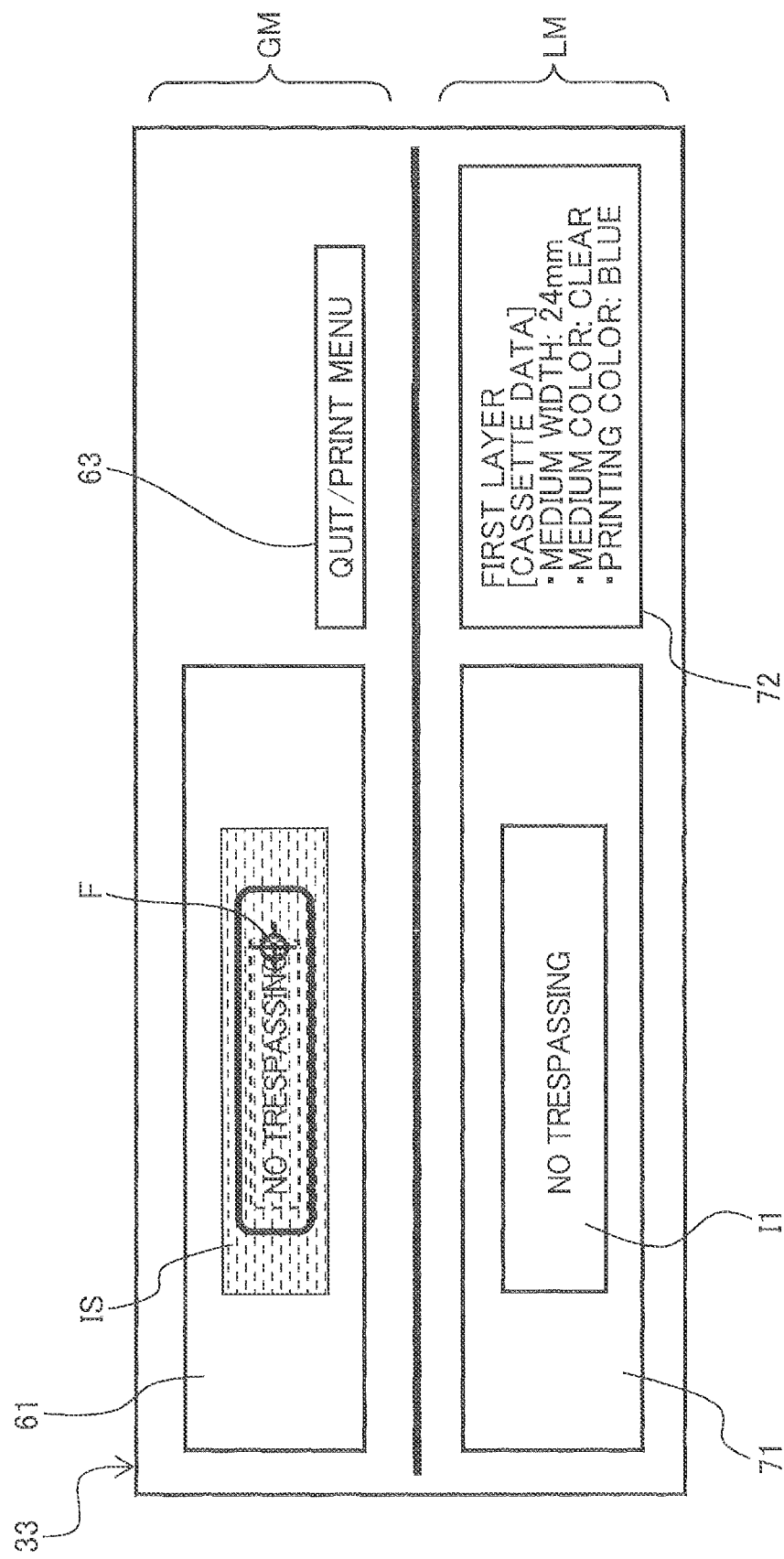

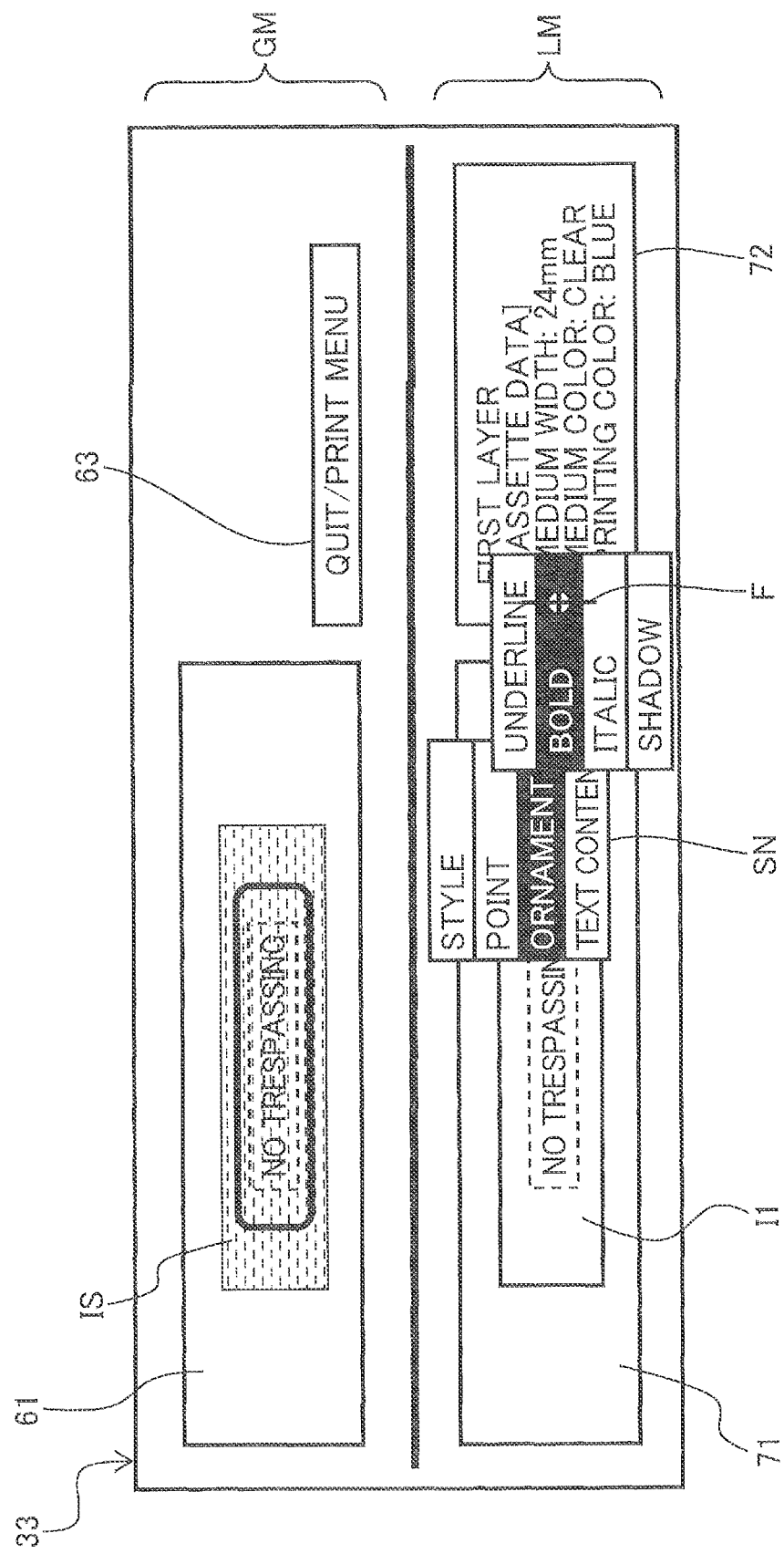

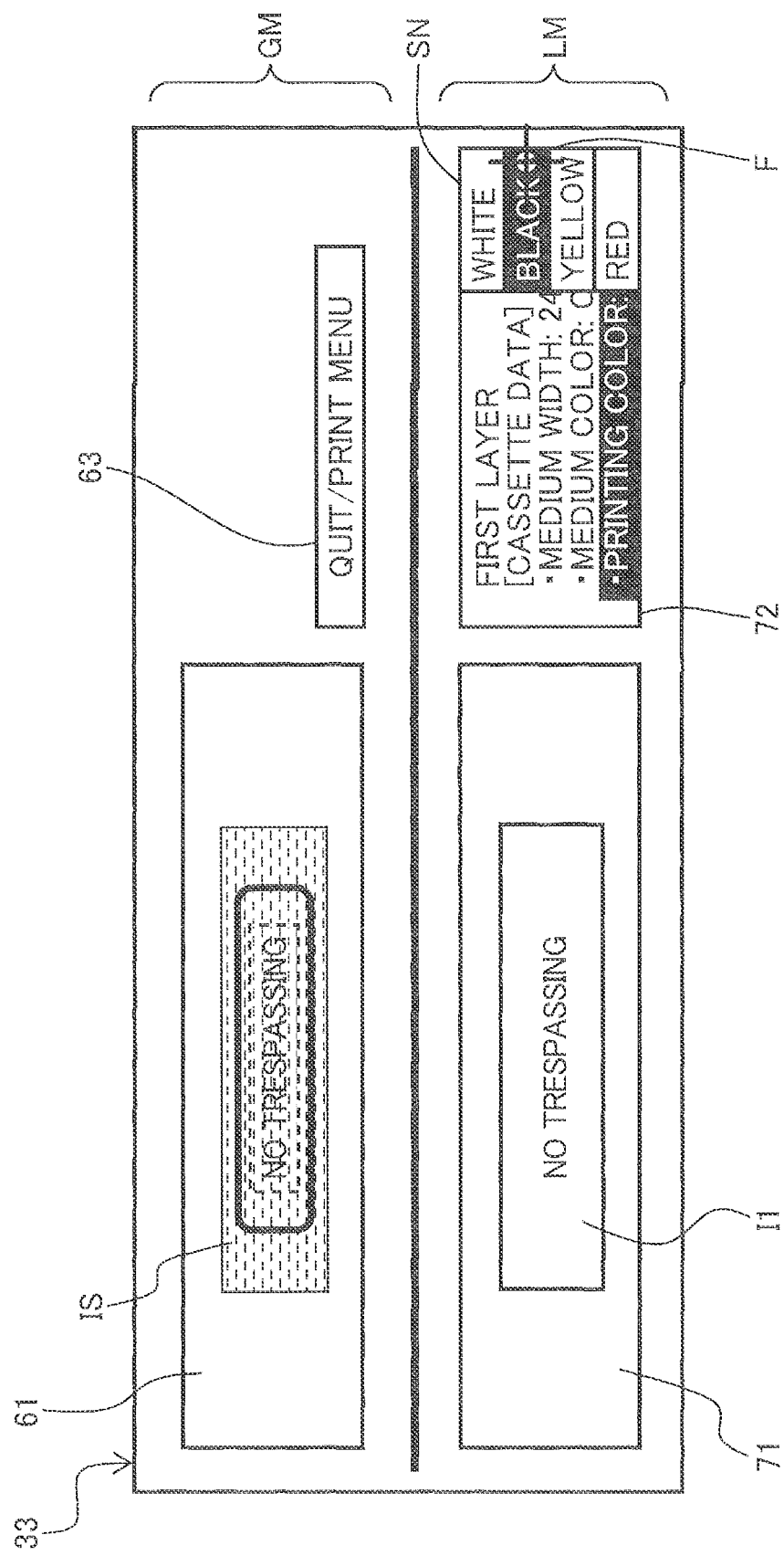

EDITING SCREEN ON MOBILE TERMINAL IN FIRST EMBODIMENT
(WHEN EDIT OBJECT OPERATION IS PERFORMED)

FIG. 12 EDITING SCREEN ON OPERATION TERMINAL IN SECOND EMBODIMENT (WHEN TEMPLATE DATA IS ACQUIRED)

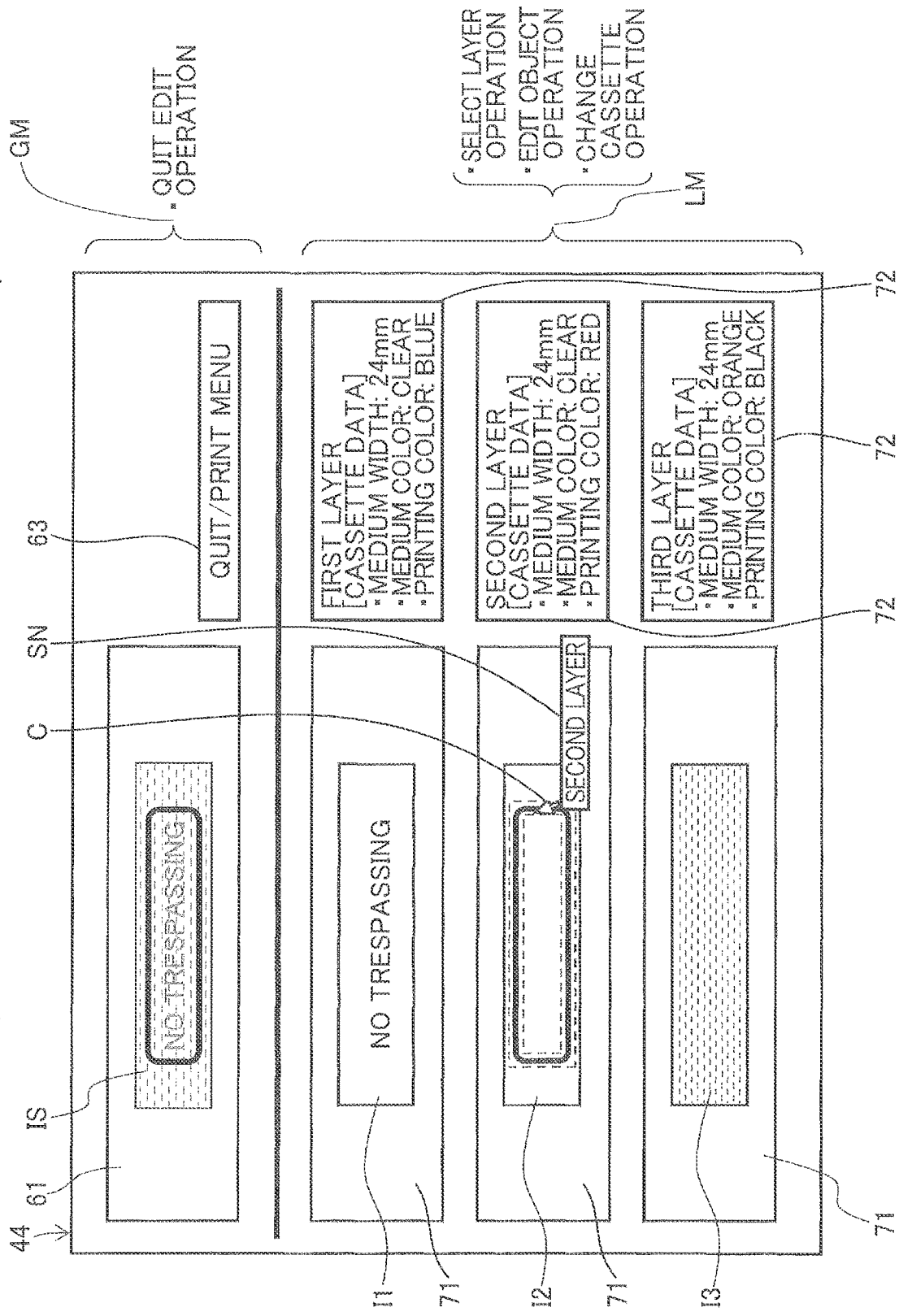

FIG. 17 EDITING SCREEN ON OPERATION TERMINAL IN THIRD EMBODIMENT
(WHEN EDIT OBJECT OPERATION IS PERFORMED)

FIG. 19 EDITING SCREEN ON OPERATION TERMINAL IN FOURTH EMBODIMENT (WHEN USER-CREATED LABEL DATA IS ACQUIRED)

US 11,977,790 B2

STORAGE MEDIUM STORING COMPUTER-READABLE INSTRUCTIONS FOR INFORMATION PROCESSING DEVICE EDITING IMAGE DATA FOR CREATING COMPOSITE LABEL

CROSS REFERENCE TO RELATED APPLICATIONS

This application claims priority from Japanese Patent Application No. 2021-022061 filed Feb. 15, 2021. The entire content of the priority application is incorporated herein by reference.

BACKGROUND

In a conventional technology, images are printed on a plurality of tape segments using a tape printer to create printed segments of tape. Subsequently, the user creates a label by overlaying the printed tape segments on each other. This technology also includes an image display apparatus that displays an editing screen for editing a tape print image. When there is a plurality of tape print images, the user can switch among the tape print images by selecting a screen display tab. Through another operation, the user can display a composite image in which each of the tape print images is superimposed in a composite image display screen different from the editing screen.

SUMMARY

However, the composite image cannot be displayed in the conventional technology described above until after the plurality of tape print images have been created. Therefore, the conventional method of creating a plurality of tape print images to be used in a superimposed state is far from efficient.

In view of the foregoing, it is an object of the present disclosure to provide a technology that facilitates a user in intuitively editing content for a plurality of print labels to be used in a superimposed state while viewing the final appearance of the overlaid print labels.

In order to attain the above and other objects, one aspect of the present disclosure provides a non-transitory computer-readable storage medium storing a set of computer-readable instructions for an information processing device. The information processing device includes: a display; an operating interface; and a processor. The set of computer-readable instructions, when executed by the processor, causes the information processing device to perform: (a) acquiring; (b) displaying; (c) receiving; and (d) identifying. The acquiring in (a) acquires, from a memory configured to store a plurality of sets of template data, a single set of template data for a single composite label selected from among the plurality of sets of template data. The single set of template data includes a plurality of sets of image data corresponding to respective ones of a plurality of print labels and representing respective ones of a plurality of label images. The single composite label is to be created using the plurality of print labels. The displaying in (b) displays on the display a composite label images in which the plurality of label images is superimposed on each other. The receiving in (c) receives a designating operation on the composite label image via the operating interface. The designating operation targets a target label image. The target label image is one of the plurality of label images. The identifying in (d) identifies target image data corresponding to the target label image from among the plurality of sets of image data.

According to the above aspect, the user can intuitively perform operations for editing the composite label image while viewing the final appearance of the superimposed label images.

According to another aspect, the present disclosure also provides a non-transitory computer-readable storage medium storing a set of computer-readable instructions for an information processing device. The information processing device includes: a display; an operating interface; and a processor. The set of computer-readable instructions, when executed by the processor, causes the information processing device to perform: (a) acquiring; (b) acquiring; (c) displaying; (d) receiving; and (e) editing. The acquiring in (a) acquires, from a first memory configured to store a plurality of sets of template data, a single set of template data for a first composite label selected from among the plurality of sets of template data. The single set of template data includes a plurality of sets of first image data corresponding to respective ones of a plurality of first print labels and representing respective ones of a plurality of first label images. The first composite label is to be created using the plurality of first print labels. The acquiring in (b) acquires, from a second memory configured to store editable data, the editable data for a second composite label. The editable data includes a plurality of sets of second image data corresponding to respective ones of a plurality of second print labels and representing respective ones of a plurality of second label images. The second composite label is to be created using the plurality of second print labels. The displaying in (c) displays on the display a composite label image in which a plurality of label images is superimposed on each other. The plurality of label images corresponds to respective ones of a plurality of print labels used for creating a composite label. The composite label image is a selected one of a first composite label image in which the plurality of first label images is superimposed on each other and a second composite label image in which the plurality of second print label images is superimposed on each other. The receiving in (d) receives an editing operation related to the composite label image via the operating interface. The editing in (e) edits, in response, to receiving the editing operation in (d), a plurality of sets of image data within an allowable editing range. The plurality of sets of image data represents respective ones of the plurality of label images and has the allowable editing range. The plurality of sets of first image data has a first allowable editing range. The plurality of sets of second image data has a second allowable editing range different from the first allowable editing range.

According to the above described above, the user can intuitively perform operations for editing the composite label image while viewing the final appearance of the superimposed label images. In addition, the user can intuitively perform the operations for editing the composite label image within different allowable editing ranges depending on the plurality of sets of image data acquired for editing.

According to still another aspect, the present disclosure also provides an information processing device including: a display; an operating interface; and a processor. The processor is configured to perform: (a) acquiring; (h) displaying; (c) receiving; and (d) identifying. The acquiring in (a) acquires, from a memory configured to store a plurality of sets of template data, a single set of template data for a single composite label selected from among the plurality of sets of template data. The single set of template data includes a plurality of sets of image data corresponding to respective ones of a plurality of print labels and representing respective ones of a plurality of label image. The single composite label is to be created using the plurality of print labels. The displaying in (b) displays on the display a composite label image in which the plurality of label images is superimposed on each other. The receiving in (c) receives a designating operation on the composite label image via the operating interface. The designating operation targets a target label image. The target label image is one of the plurality of label images. The identifying in (d) identifies target image data corresponding to the target label image from among the plurality of sets of image data.

According to the information processing device described above, the user can intuitively perform operations for editing the composite label image while viewing the final appearance of the superimposed label images.

According to still another aspect, the present disclosure also provides an information processing device including a display; an operating interface; and a processor. The processor is configured to perform: (a) acquiring; (b) acquiring; (c) displaying; (d) receiving; and (e) editing. The (a) acquiring acquires, from a first memory configured to store a plurality of sets of template data, a single set of template data for a first composite label selected from among the plurality of sets of template data. The single set of template data includes a plurality of sets of first image data corresponding to respective ones of a plurality of first print labels and representing respective ones of a plurality of first label images. The first composite label is to be created using the plurality of first print labels. The acquiring in (b) acquires, from a second memory configured to store editable data, the editable data for a second composite label. The editable data includes a plurality of sets of second image data corresponding to respective ones of a plurality of second print labels and representing respective ones of a plurality of second label images. The second composite label is to be created using the plurality of second print labels. The displaying in (c) displays on the display a composite label image in which a plurality of label images is superimposed on each other. The plurality of label images corresponds to respective ones of a plurality of print labels used for creating a composite label. The composite label image is a selected one of a first composite label image in which the plurality of first label images is superimposed on each other and a second composite label image in which the plurality of second print label images is superimposed on each other. The receiving in (d) receives an editing operation related to the composite label image via the operating interface. The editing in (e) edits, in response to receiving the editing operation in (d), plurality of sets of image data within an allowable editing range. The plurality of sets of image data represents respective ones of the plurality of label images and has the allowable editing range. The plurality of sets of first image data has a first allowable editing range. The plurality of sets of second image data has a second allowable editing range different from the first allowable editing range.

According to the information processing device described above, the user can intuitively perform operations for editing the composite label image while viewing the final appearance of the superimposed label images. In addition, the user can intuitively perform the operations for editing the composite label image within different allowable editing ranges depending on the plurality of sets of image data acquired for editing.

The present disclosure is not limited to a non-transitory computer-readable storage medium storing a set of computer-readable instructions for an information processing device and an information processing device, but can be applied to a print control device, an editing method executed using the set of computer-readable instructions, a print control method, and the like as appropriate.

The configuration of the present disclosure facilitates a user in intuitively editing content for a plurality of print labels to be used in a superimposed state while viewing the final appearance of the overlaid print labels.

BRIEF DESCRIPTION OF THE DRAWINGS

The particular features and advantages of the disclosure as well as other objects will become apparent from the following description taken in connection with the accompanying drawings, in which:

FIG. 4A is an explanatory diagram illustrating the appearance of three print labels and a composite label formed by overlaying the print labels;

FIG. 4B is an explanatory diagram illustrating sample composite label template data used for creating the three print labels and the composite label shown in FIG. 4A;

FIG. 4C is an explanatory diagram illustrating displayed images of the three print labels and the composite label shown in FIG. 4A;

FIG. 5 is an explanatory diagram illustrating an example of an editing screen displayed on the mobile terminal when composite label template data is acquired;

FIG. 6 is an explanatory diagram illustrating an example of an editing screen displayed on the mobile terminal when a select layer operation is performed for a first layer;

FIG. 7 is an explanatory diagram illustrating an example of an editing screen displayed on the mobile terminal when an edit object operation is performed for the first layer;

FIG. 8 is an explanatory diagram illustrating an example of an editing screen displayed on the mobile terminal when an operation to modify cassette data is performed for the first layer;

FIG. 16 is an explanatory diagram illustrating an example of an editing screen displayed on the operation terminal when a select layer operation is performed for the second layer;

FIG. 17 is an explanatory diagram illustrating an example of an editing screen displayed on the operation terminal when an edit object operation is performed for the second layer;

DETAILED DESCRIPTION

Next, embodiments of the present disclosure will be described while referring to the accompanying drawings.

First Embodiment

To begin, a first embodiment of the present disclosure will be described.

<Overall Configuration of a Printing System>

Figure 1:
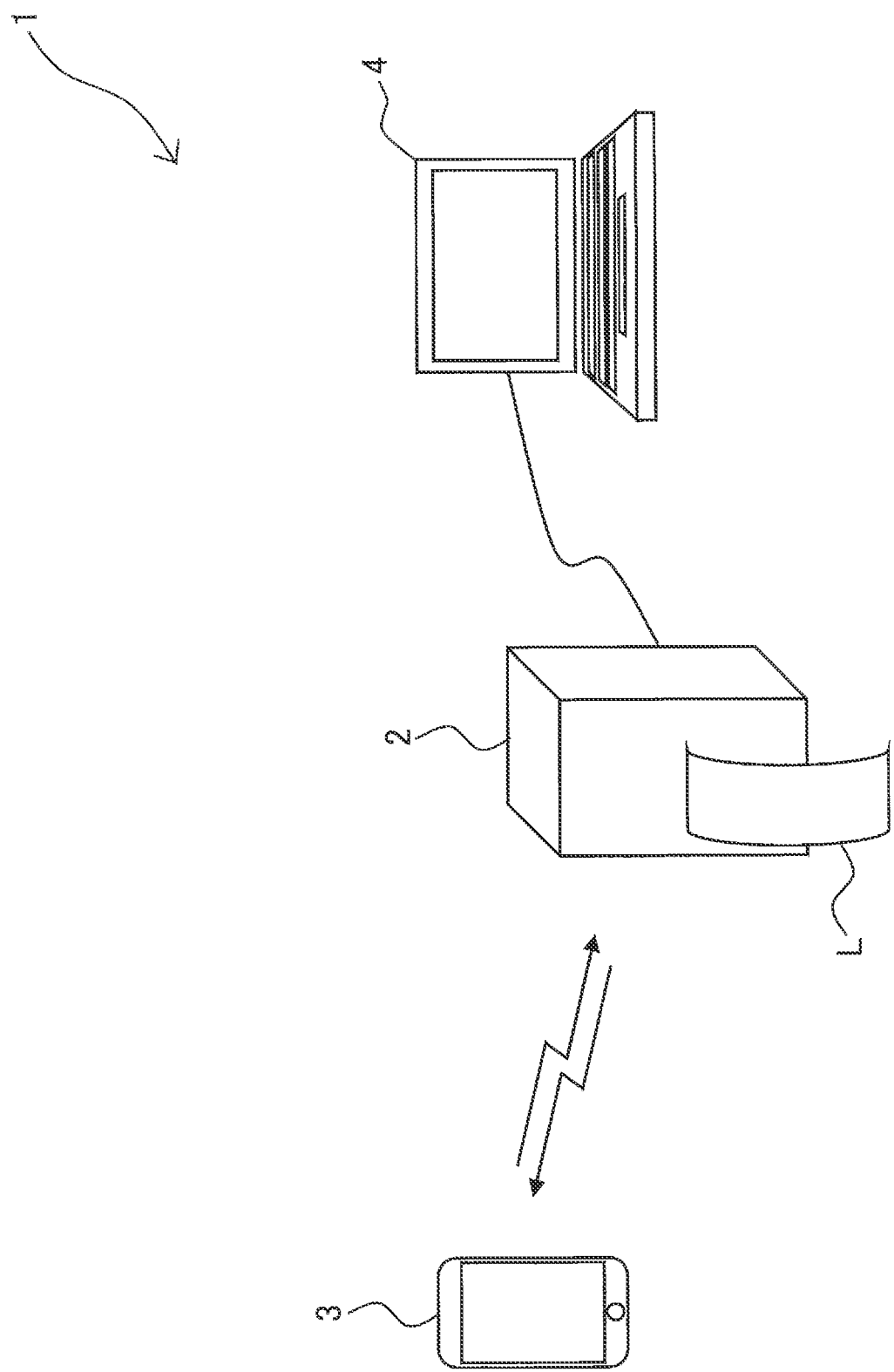
FIG. 1 is an explanatory diagram schematically illustrating the overall configuration of a printing system according to the present disclosure.

FIG. 1 shows the overall configuration of a printing system 1 according to the present embodiment. In FIG. 1, the printing system 1 has a label printer 2, a mobile terminal 3, and an operation terminal 4 configured of a common personal computer, for example. The mobile terminal 3 could be configured of a smartphone, as depicted in the drawing, or a tablet computer or the like. The mobile terminal 3 and operation terminal 4 are each connected to and capable of exchanging information with the label printer 2. In the example depicted in FIG. 1, the mobile terminal 3 is connected to the label printer 2 via a wireless connection and the operation terminal 4 is connected to the label printer 2 via a wired connection.

Note that mobile terminal 3 may also be connected to the label printer 2 via a wired connection, while the operation terminal 4 may be connected to the label printer 2 via a wireless connection. Wireless communication may be performed according to a wireless local area network (hereinafter abbreviated as "LAN"), such as Wi-Fi, or according to Bluetooth, for example, while wired communication may be achieved with a wired LAN technology, such as Ethernet, or a universal serial bus (hereinafter abbreviated as "USB") connection. "Wi-Fi" is a Japanese registered trademark of Wi-Fi. Alliance. "Bluetooth" is a Japanese registered trademark of Bluetooth SIG, Incorporated. "Ethernet" is a Japanese trademark of FUJIFILM Business Innovation Corp. The label printer 2 creates print labels L based on user operations on the mobile terminal 3 or operation terminal 4.

<Operation Terminal>

Figure 2:
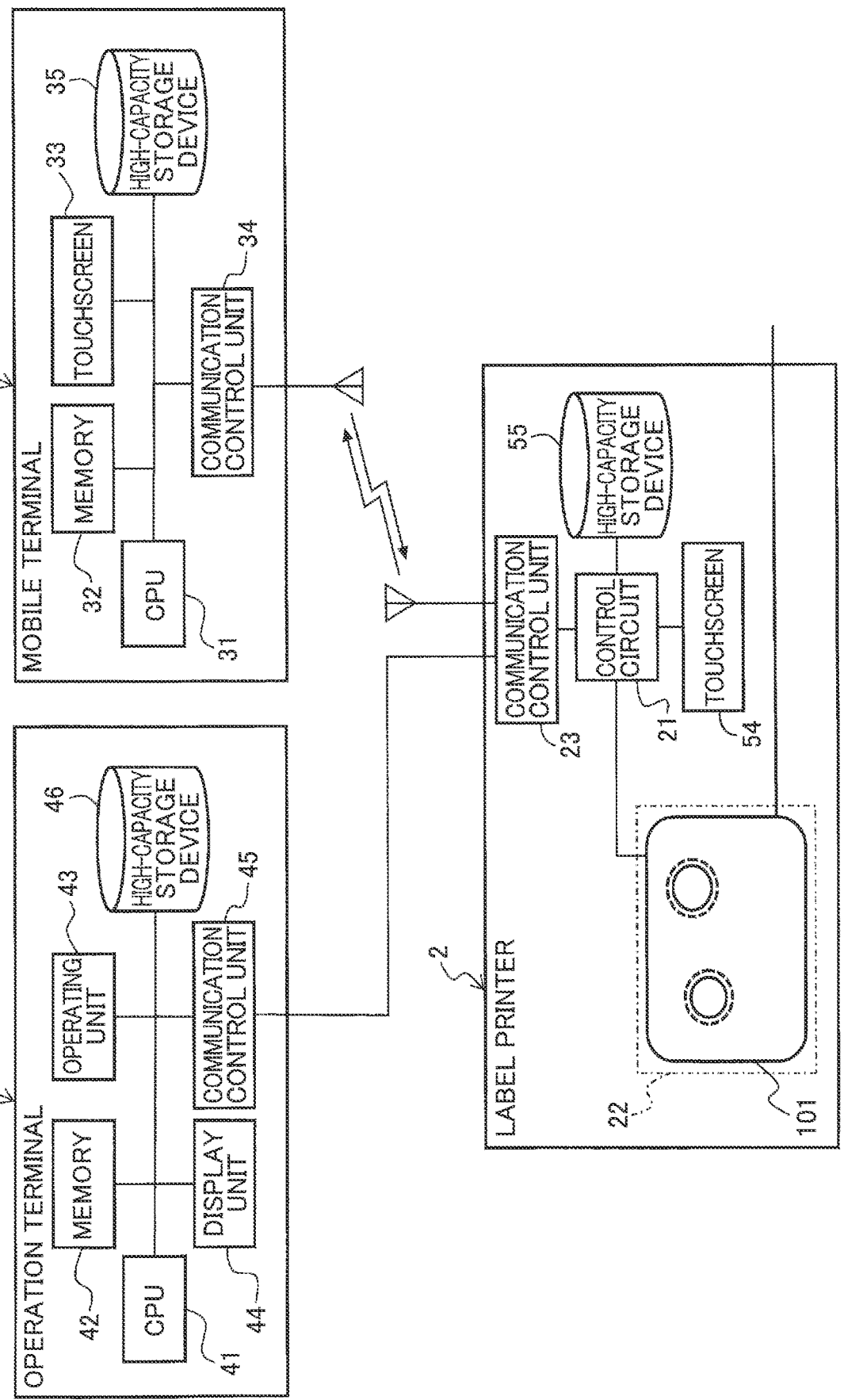
FIG. 2 is a block diagram illustrating the functional configuration of the printing system including an operation terminal, a mobile terminal and a label printer.

As shown in FIG. 2, the operation terminal 4 is provided with a central processing unit (hereinafter abbreviated as "CPU") 41, a memory 42, an operating unit 43, a display unit 44, a communication control unit 45, and a high-capacity storage device 46. The memory 42 is configured of a random-access memory (hereinafter abbreviated as "RAM") and a read-only memory (hereinafter abbreviated as "ROM"), for example.

The operating unit 43 is configured of a mouse and a keyboard, for example. The user inputs instructions, information, and the like on the operating unit 43, The display unit 44 is configured of a liquid crystal display, for example. The display unit 44 displays various information and messages. The communication control unit 45 controls the exchange of signals with the label printer 2 through wired communication in this example. The high-capacity storage device 46 stores various programs and information. The CPU 41 uses the temporary storage function of the RAM in the memory 42 to perform various processes and exchange various signals with the label printer 2 according to programs pre-stored in the RUM of the memory 42 or the high-capacity storage device 46. In this example, a print data editing program, composite label template data, and user-created composite label data described later are stored in the memory 42 or the high-capacity storage device 46 in advance.

<Mobile Terminal>

As shown in FIG. 2, the mobile terminal 3 is provided with a CPU 31, a memory 32, a touchscreen 33, a communication control unit 34, and a high-capacity storage device 35. The memory 32 is configured of a RAM and a RUM, for example.

The touchscreen 33 is configured by combining a liquid crystal display with a touchpad. The touchscreen 33 displays various information and messages and accepts user input of commands and the like at operated positions on the display screen. The communication control unit 34 controls the exchange of signals with the label printer 2 through wireless communication in this example. The high-capacity storage device 35 stores various programs and information. The CPU 31 uses the temporary storage function of the RAM in the memory 32 to perform various processes and exchange various signals with the label printer 2 according to programs pre-stored in the ROM of the memory 32 or the high-capacity storage device 35. In this example, a print data editing program, composite label template data, and user-created composite label data described later are stored in the memory 32 or the high-capacity storage device 35 in advance.

<Label Printer>

As shown in FIG. 2, the label printer 2 has a control circuit 21, a cassette holder 22, a communication control unit 23, a touchscreen 54, and a high-capacity storage device 55. A tape cassette 101 is detachably mountable in the cassette holder 22. The label printer 2 can exchange information with the operation terminal 4 or the mobile terminal 3 when the control circuit 21 connects to the communication control unit 34 of the mobile terminal 3 or the communication control unit 45 of the operation terminal 4 via the communication control unit 23. The touchscreen 54 has similar functions to the touchscreen 33 provided in the mobile terminal 3. A print data editing program, composite label template data, and user-created composite label data described later are stored in the high-capacity storage device 55 in advance.

In the above description, the CPU 31, the CPU 34, and the control circuit 21 are examples of the processor of the present disclosure. The memory 32, the memory 42, the high-capacity storage device 35, the high-capacity storage device 46, and the high-capacity storage device 55 are examples of the memory, the first memory, and the second memory of the present disclosure. The display unit 44, the touchscreen 33, and the touchscreen 54 are examples of the display of the present disclosure. The operation unit 43, the touchscreen 33, and the touchscreen 54 are examples of the operating interface of the present disclosure.

<Tape Cassette and Cassette Holder>

Figure 3:
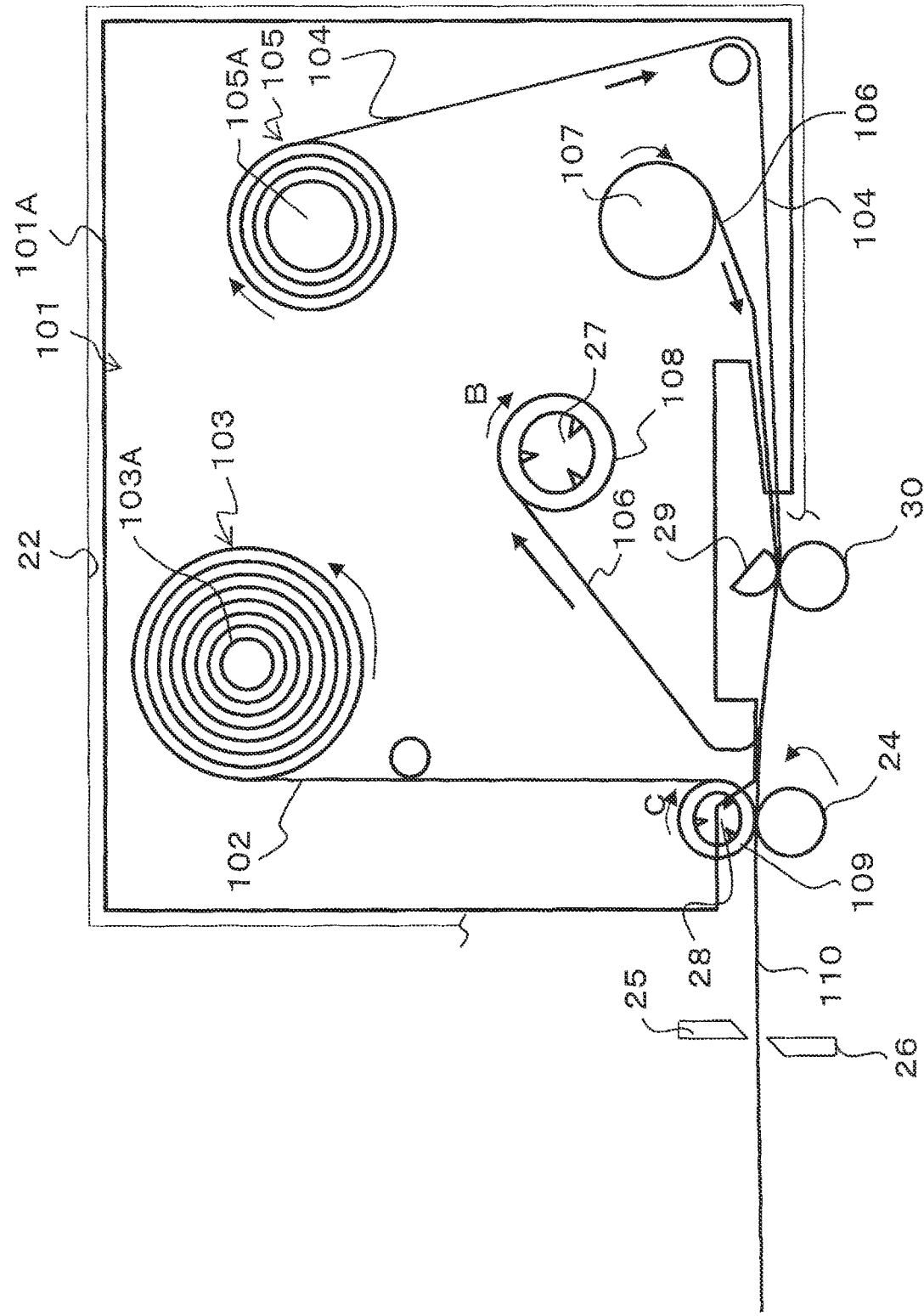
FIG. 3 is a schematic diagram illustrating the internal structure of a tape cassette.

FIG. 3 shows a detailed structure of the tape cassette 101 and the related structure of the cassette holder 22. The tape cassette 101 has a housing 101A and, disposed within this housing 101A, a first roll 103, a second roll 105, a ribbon supply roll 107, a ribbon take-up roller 108, and a tape feed roller 109. The first roll 103 is formed of a strip-like base tape 102 wound into a roll. The second roll 105 is formed of a transparent cover film 104 having the same width as the base tape 102. The second roll 105 is also wound into a roll. The ribbon supply roll 107 pays out an ink ribbon 106. The ribbon take-up roller 108 takes up the ink ribbon 106 that has been used for printing. The tape feed roller 109 is rotatably supported near a tape discharge portion of the tape cassette 101. Note that the ink ribbon 106 is unnecessary when the cover film 104 is a heat-sensitive tape that can produce a prescribed color when heated. Further, although depicted as concentric circles in the drawing for simplification, the first roll 103 and second roll 105 are actually wound in a spiral shape.

More specifically, the first roll 103 includes a reel member 103A around which the base tape 102 is wound. The base tape 102 is configured of a bonding adhesive layer, a base layer, a mounting adhesive layer, and a release layer, for example. These layers are laminated sequentially from the inward-facing side of the base tape 102 forming the first roll 103 toward the opposite side. The second roll 105 similarly includes a reel member 105A around which the cover film 104 is wound. The tape feed roller 109 bonds the base tape 102 to the cover film 104 with pressure to form a print label tape 110 while conveying the same.

A ribbon take-up roller drive shaft 27 and a tape feed roller drive shaft 28 are disposed in the cassette holder 22. The ribbon take-up roller drive shaft 27 is provided for taking up the portion of the ink ribbon 106 already used for printing in the tape cassette 101. The tape feed roller drive shaft 28 is provided for conveying the print label tape 110 described above. A conveying roller motor (not shown) transmits a drive force to the ribbon take-up roller drive shaft 27 and tape feed roller drive shaft 28 for driving the ribbon take-up roller 108 and tape feed roller 109 to rotate in association with the ribbon take-up roller drive shaft 27 and tape feed roller drive shaft 28. The cassette holder 22 is also provided with a print head 29 that prints desired content on the cover film 104 as the cover film 104 is conveyed. The print head 29 is an example of the printing portion of the present disclosure.

In the cassette holder 22, a fixed blade 25 and a movable blade 26 are provided along the conveying path of the print label tape 110 on the downstream side of the tape feed roller 109 and a pressure roller 24 described later. In cooperation with the fixed blade 25, the movable blade 26 cuts through the print label tape 110 in the thickness direction.

<Outline of Label Printer Operations>

In the label printer 2 having the above construction, the cover film 104 and ink ribbon 106 become interposed between the print head 29 and a platen roller 30 opposing the print head 29 when the tape cassette 101 is mounted in the cassette holder 22. At the same time, the base tape 102 and cover film 104 become interposed between the tape feed roller 109 and a pressure roller 24 opposing the tape feed roller 109. When the ribbon take-up roller 108 and tape feed roller 109 are driven to rotate in synchronization along the directions indicated in FIG. 3 by the respective arrows B and C, the platen roller 30 and pressure roller 24 rotate. The base tape 102 is paid out from the first roll 103 and supplied to the tape feed roller 109. The cover film 104 is paid out from the second roll 105 while a print driving circuit (not shown) energizes a plurality of heating elements in the print head 29 to print on the cover film 104 with the ink ribbon 106. The ribbon take-up roller drive shaft 27 drives the ribbon take-up roller 108 to take up the ink ribbon 106 that has been used for printing on the cover film 104.

The base tape 102 and the printed portion of the cover film 104 are integrally bonded between the tape feed roller 109 and the pressure roller 24 to form the print label tape 110, and the print label tape 110 is conveyed out of the tape cassette 101. The portion of the print label tape 110 conveyed out of the tape cassette 101 is cut off through the cooperative operations of the fixed blade 25 and movable blade 26, producing a print label L. The print label L is an example of the print label of the present disclosure.

<Composite Labels, Label Data, and Displayed Images>

The background color and object color of a print label L is determined by the colors of the base tape 102 and ink ribbon 106 accommodated in the housing 101A of the tape cassette 101. Thus, one print label L has a single object color corresponding to the color of the ink ribbon 106. However, by bonding a print label L having a transparent base tape 102 and a red object color to the top surface of a print label L having a black object color, for example, it is possible to create a print label L expressing both black and red object colors since the black object in the lower layer is visible through the transparent base tape 102.

In the present embodiment, a label created by superposing and bonding together a plurality of print labels L in the thickness direction will be called a composite label LS. The user overlays a plurality of print labels L created by the label printer 2 based on their individual label data and bonds the print labels L together. Subsequently, the user fixes the print labels L in this bonded state to a desired object. Here, such print labels L and their label data, together with images displayed on the display unit 44 or the touchscreens 33 and 54, will be described with reference to FIGS. 4A, 4B and 4C.

The example of FIG. 4A shows the appearance of three print labels L1, L2, and L3 created by the label printer 2, and a composite label LS formed by overlaying the print labels L1, L2, and L3, in this example, the print label forming the topmost layer when the print labels are superposed, i.e., the print label positioned on the top surface, will be called a first-layer print label L1. The print label bonded directly to the back surface of the first-layer print label L1 will be called a second-layer print label L2. The print label forming the bottommost layer, i.e., the label positioned on the bottom surface, and directly bonded to the back surface of the second-layer print label L2 will be called a third-layer print label L3.

In the example shown in FIG. 4A, the text "NO TRESPASSING" is printed in a central region of the first-layer print label L1. The text is printed on a transparent tape in a blue printing color. A graphic of a square border with rounded corners that surrounds the area of the text described above is printed in a central region of the second-layer print label L2. The graphic is printed on a transparent tape in a red printing color. A background pattern of horizontal dashes is printed across the entire surface of the third-layer print label L3. The background pattern is printed on an orange-colored tape in a black printing color. By bonding these three print labels together in the order of the layers described above, the composite label LS shown on the top of FIG. 4A is produced. The appearance presented by this composite label LS includes the character string in blue text surrounded by the substantially rectangular red border graphic on an orange background whose entire surface has been filled with a black background pattern.

Although each print label can only be printed in a single color with the label printer 2 having the configuration described above, a plurality of colors can be expressed in a composite label LS produced by bonding together a plurality of print labels having different print colors.

FIG. 4B shows sample composite label template data that is used for creating the composite label LS described above. This composite label template data comprises three sets of label data that the label printer 2 uses for creating each of the three print labels and, hence, is data for the single composite label LS described above. The dataset for the first-layer print label L1 described above is first-layer label data; the dataset for the second-layer print label L2 is second-layer label data; and the dataset for the third-layer print label L3 is third-layer label data. The layers are associated with the order in which they are to be superposed. Each set of layer label data has corresponding cassette data and object data.

The cassette data is data describing the tape cassette 101 to be used for creating the corresponding print label. In this example, the cassette data includes data for each of a medium width, a medium color, and a printing color. The medium width is the width of the base tape 102, and the medium color is the color of the base tape 102. The printing color is the ink color of the ink ribbon 106. Note that the content of the cassette data itself or the type of the tape cassette 101 designated by the cassette data is an example of the print medium type, while the color specified by data for the printing color is an example of the color corresponding to the another print medium type.

The object data is data describing the object, i.e., the printing content for the corresponding print label. The object data includes the type of object (object type), and various data defining printing content in accordance with the object type.

The composite label template data is data that has been created in advance and provided by the manufacturer of the label printer 2, for example. A plurality of sets of composite label template data, each of which includes a plurality of sets of layer label data, such as that described above, is stored in the high-capacity storage devices 35, 46, and 55 of the corresponding mobile terminal 3, operation terminal 4, and label printer 2. Each set of layer label data includes object data and cassette data for printing each of the labels. When executing the print data editing program described above, the CPU 31, CPU 41, or control circuit 21 of the corresponding mobile terminal 3, operation terminal 4, or label printer 2 first displays a list (not shown) of the sets of composite label template data stored in the corresponding high-capacity storage device 35, 46, or 55 on the touchscreen 33, display unit 44, or touchscreen 54. The user selects desired composite label template data from the list to be used as the template and performs editing operations on the template to modify the content of each layer label data according to the user's objectives. As an alternative, the mobile terminal 3 and operation terminal 4 may acquire the sets of composite label template data from the high-capacity storage device 55 of the label printer 2 or from an external server (not shown) through wireless or wired communication.

During editing operations using the print data editing program according to the present embodiment, a composite image IS for the composite label LS is continuously displayed on the screen of the touchscreen 33, display unit 44, or touchscreen 54 as indicated by the topmost image in FIG. 4C. The composite image IS combines the content of all layer label data at that point of the editing operations. A composite image display region GM (see FIG. 5 and subsequent drawings described later) denotes primarily the region of the screen on the touchscreen 33, display unit 44, or touchscreen 54 in which the composite image IS is displayed. The composite image IS is an example of the composite label image of the present disclosure.

Layer images I1, I2, and I3 corresponding to each set of layer label data, i.e., a first-layer image I1 corresponding to the first-layer label data, a second-layer image I2 corresponding to the second-layer label data, and a third-layer image I3 corresponding to the third-layer label data, are displayed together with the composite image IS on the screen of the touchscreen 33, display unit 44, or touchscreen 54 as needed during editing operations. Each of the layer images I1, I2, and I3 shows the individual content of the corresponding set of layer label data at the current point in time of the editing operations. A layer image display region LM (see FIG. 5 and subsequent drawings described later) denotes primarily the region on the screen of the touchscreen 33, display unit 44, or touchscreen 54 in which the layer images I1, I2, and I3 are displayed. The first-layer image I1, second-layer image I2, and third-layer image I3 are examples of the label images of the present disclosure.

There are primarily four types of editing operations that the user can perform while editing with the print data editing program: a select layer operation; an edit object operation; a change cassette operation; and a quit edit operation. These types of user operations will be described later in greater detail.

To maintain their function as a template, the composite label template data in the present embodiment defines certain restrictions on what data items the user can modify and what range of modification is allowed. For example, while the user can modify printing content for object data in each of the sets of layer label data, the user cannot modify the object type itself (text, graphic, and background fill pattern in the example of the drawings) nor the number of layers. These restrictions preserve the display configuration as the combination of object types described in the composite label template data.

<Editing Screens Displayed on the Mobile Terminal>

The example in the present embodiment shows steps for editing and printing a composite label template according to the print data editing program executed on the mobile terminal 3. Below, specific display content in the editing screens for the composite label template data will be described.

When the print data editing program is executed on the mobile terminal 3, first a plurality of sets of composite label template data is displayed in a list on the touchscreen 33 from which the user can select any set. The displayed list includes a thumbnail image of the composite image represented by each set of composite label template data, and the cassette types required for printing each set of composite label template data. Once the user has selected a desired set of composite label template data from the displayed list, the selected composite label template data is acquired from the high-capacity storage device 35 (not shown in the drawings). Next, a default composite image IS corresponding to the unedited content of the composite label template data acquired above is displayed in an editing screen on the touchscreen 33.

In the present embodiment, a composite image display region GM for displaying the composite image IS and a layer image display region LM for displaying one of the three layer images I1, I2, and I3 are displayed adjacent to each other vertically on the touchscreen 33 in the editing screen. Thus, the number of layer images that can be displayed in the editing screen at one time is limited to just two. By limiting the number of layer images displayed on the touchscreen 33, the user can more clearly see the displayed images and can more easily perform editing operations, even though the touchscreen 33 of the mobile terminal 3 has a small display area and operation area.

As shown in the drawings, a composite image window 61 for displaying the composite image IS and a. Quit button 63 for inputting a command to quit editing operations and advance to the subsequent print menu are displayed in the composite image display region. GM. A layer image window 71 for displaying one of the layer images I1, I2, and I3 and an auxiliary window 72 for displaying the layer number for the displayed layer images I1, I2, or I3 and the content of the corresponding cassette data are displayed in the layer image display region LM. Note that only the composite image IS corresponding to the selected composite label template data is displayed in the composite image window 61 immediately after the composite label template data is acquired while nothing is displayed yet in the layer image display region LM, as illustrated in FIG. 5.

As described above, there are primarily four types of editing operations that the user can perform in the editing screen: a select layer operation, an edit object operation, a change cassette operation, and a quit edit operation. In the example of the present embodiment, two of these operations are received in the composite image display region GM and the other two are received in the layer image display region LM. The two operations received in the composite image display region GM are the select layer operation and the quit edit operation. The two operations received in the layer image display region LM are the edit object operation and the change cassette operation.

In the example of the present embodiment, the above operations are indicated through gestures that the user can perform directly on the touchscreen 33. These gestures include tapping a finger anywhere in the entire editing screen to indicate a position, sliding the finger to move the tapped position, and pressing the screen at the current tapped position. However, other gestures may be performed for editing objects. For example, an operation to move the position of an object may be achieved by placing a finger on top of the object and dragging the object. An operation to modify the size of an object may be achieved by placing two fingers on the object and pinching the fingers toward each other or spreading them apart. All operation to input characters for modifying the character content of text may be achieved through a simple input screen (not shown).

After acquiring composite label template data and displaying the corresponding composite image IS as described above, the user performs a select layer operation, as illustrated in FIG. 6.

As described above, the composite label template data recorded in the high-capacity storage device 35 has a plurality of sets of object data. The sets of object data have mutually different printing colors and are divided among individual sets of corresponding layer label data. Hence, when the user wishes to modify one of the objects through editing operations, the user must first perform an operation to select the layer corresponding to the object being modified. In other words, editing is performed in units of layers.

When the user taps on the composite image IS displayed in the composite image display region GM, the object at the tapped position F is identified as the object to be edited. Next, the layer image I1, I2, or I3 for the layer that includes the identified object and the cassette data specifying the cassette to be used for printing that layer are displayed in the layer image display region LM. In the example of FIG. 6, the user has tapped on the text object "NO TRESPASSING" in the composite image IS displayed in the composite image display region GM. As a result, the first layer corresponding to the text object is displayed in the layer image display region LM as the layer image I1. The layer label data corresponding to the identified object is an example of the target image data of the present disclosure.

Next, when the user taps on the layer image I1, a popup menu SN corresponding to the object is displayed, as illustrated in FIG. 7. The user follows desired branches in the popup menu SN to nested submenus and presses on a menu item to perform a desired modification. This popup menu SN only displays menu items that the user is not restricted from modifying. Though not illustrated in the drawing, the user may perform a drag gesture to change the position of an object by tapping on and moving the object in one continuous gesture. In this example of a text object, the user may also call up a separate simple input screen to change the character content of the text pressing on the menu item "TEXT CONTENT." If the user wishes to modify the character size of a text object, the user may specify a point size from among point values indicated in the popup menu SN. To modify the font of a text object, the user may specify a desired font from among styles listed in the popup menu SN. In the example of FIG. 7, the user has modified the text object to make the text bold. When the user performs an editing operation on this object, the same content of the modification is reflected in real-time in the text object included in the composite image IS displayed in the composite image display region GM. In the present embodiment, the tapping operation on the compound image IS is an example of the editing operation on the composite label image of the present disclosure, and the reflected display of the content of the modification is an example of the (e) updating and the (f) updating of the present disclosure.

To modify cassette data, the user may tap in the display region of the layer image display region LM for cassette data and follow the relevant branches in the popup menu SN to nested submenus in order to modify the desired content, as illustrated in FIG. 8. Operations to modify the cassette data are particular necessary when changing the printing color for an object. When the user performs a modification operation to change the printing color, the same content of the modification operation for the printing color is reflected in real-time both in the composite image display region GM and the layer image display region LM. Note that the tape cassette 101 to be actually mounted in the label printer 2 is configured as a unit to correspond uniquely to the combination of all data content included in the cassette data. Therefore, modifications to cassette data content are restricted to the content matching the configurations for cartridges 101 of types that the manufacturer actually manufactures and sells.

Figure 9:
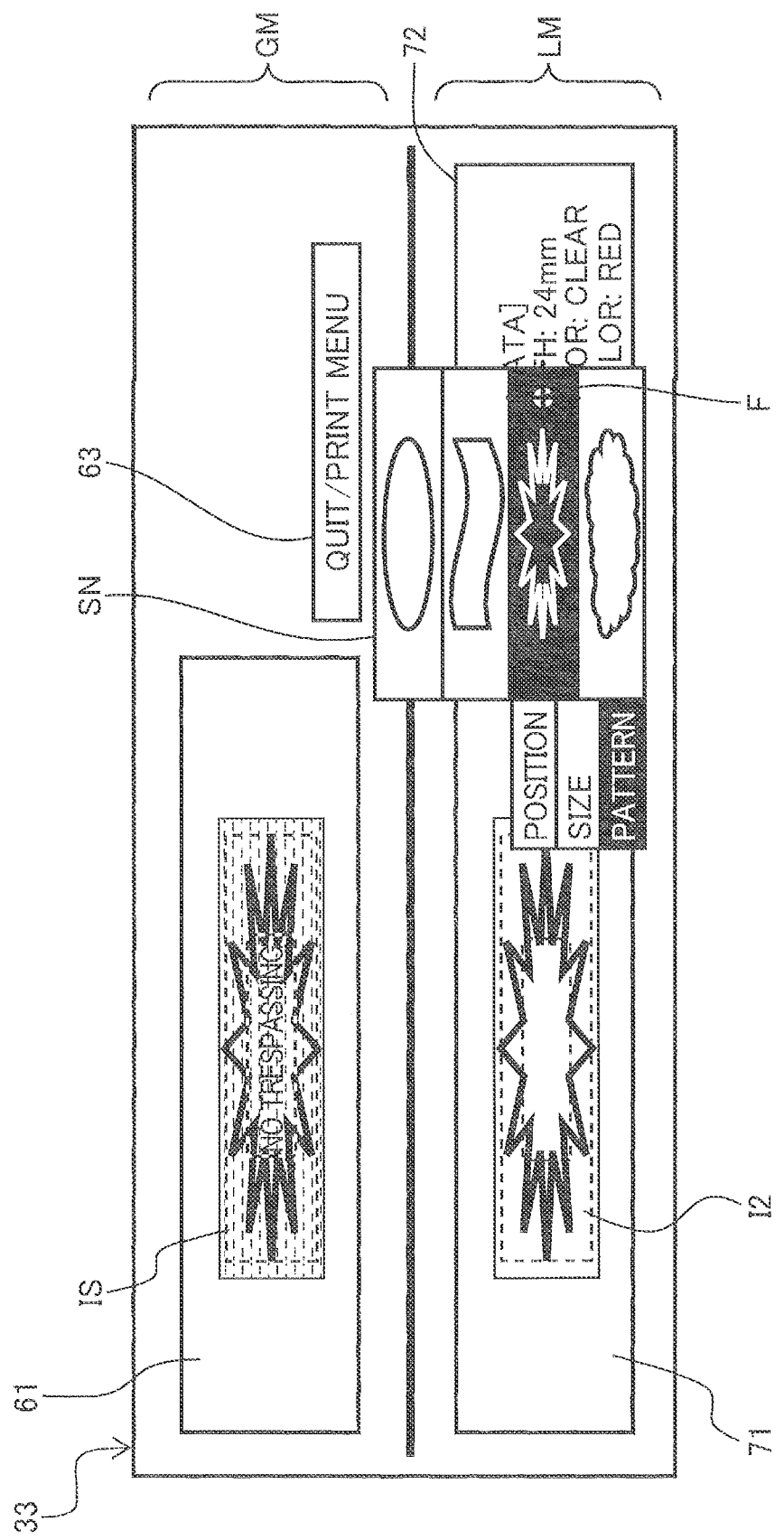
FIG. 9 is an explanatory diagram illustrating an example of an editing screen displayed on the mobile terminal when an edit object operation is performed for a second layer.
Figure 10:
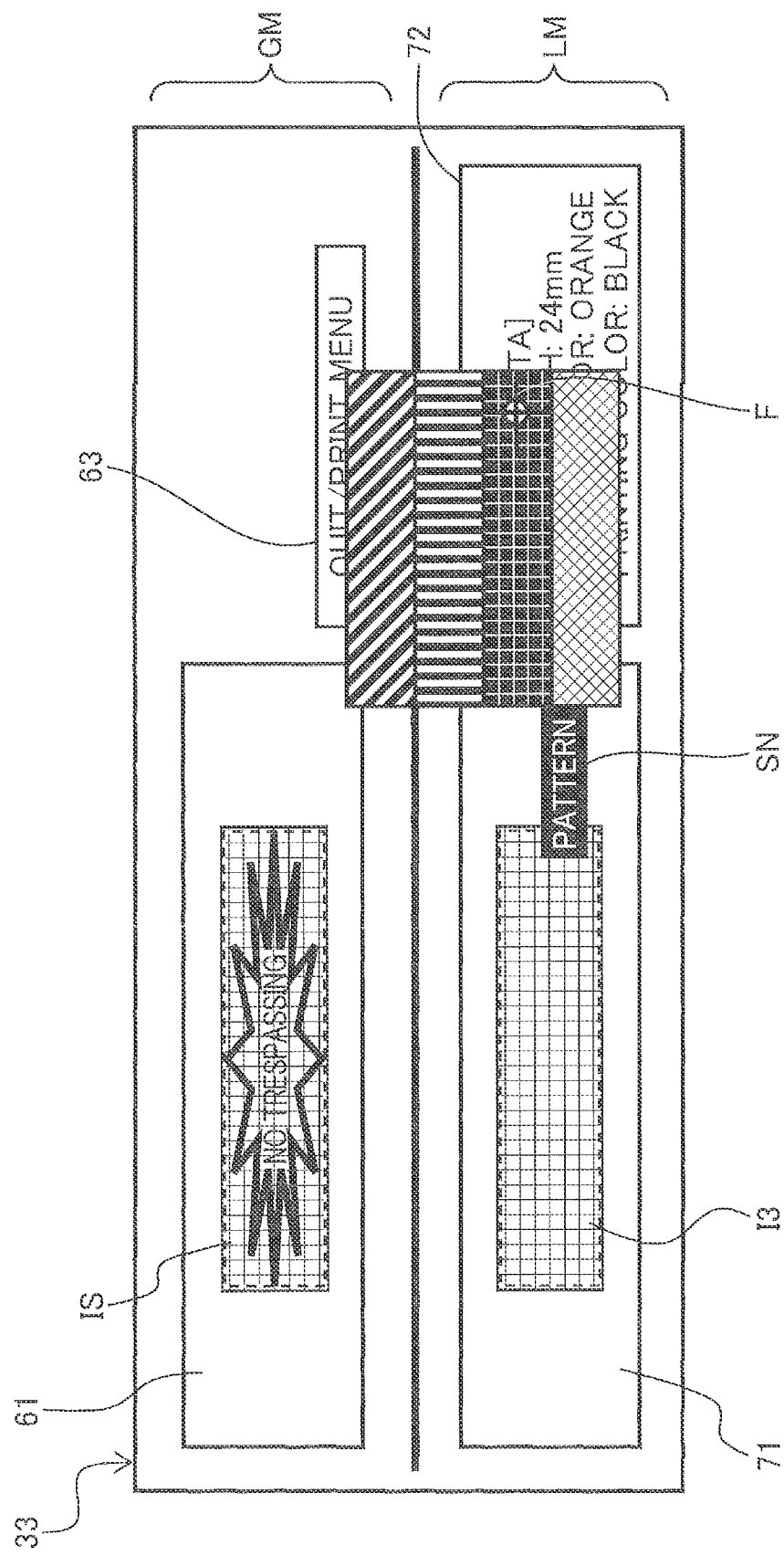
FIG. 10 is an explanatory diagram illustrating an example of an editing screen displayed on the mobile terminal when an edit object operation is performed for a third layer.

Further, if the object tapped in the composite image IS is the graphic object corresponding to the second layer, the layer image I2 and its cassette data are displayed in the layer image display region LM, as illustrated in FIG. 9. If the object tapped in the composite image IS is the background fill pattern object corresponding to the third layer, the layer image I3 and its cassette data are displayed in the layer image display region LM, as shown in FIG. 10. In addition to modifying content of the cassette data, the user can modify the graphic pattern for a graphic Object or the background pattern in a background fill pattern object to one of the options displayed in the popup menu SN. Modifications made through operations in the layer image display region LM are reflected in real-time in the composite image IS of the composite image display region GM.

To quit editing operations in order to create a composite label LS with the composite image IS produced through the editing operations, the user performs a quit edit operation by tapping on and pressing the Quit button 63 displayed in the composite image display region GM. Once the quit edit operation is performed, the CPU 31 generates edited label data based on the editing operations performed on the composite image IS and displays a print menu screen (not shown) on the touchscreen 33. In this print menu screen, the user perform operations to execute printing processes for print jobs corresponding to each set of layer label data included in the edited label data.

<Control Procedure>

Figure 11:
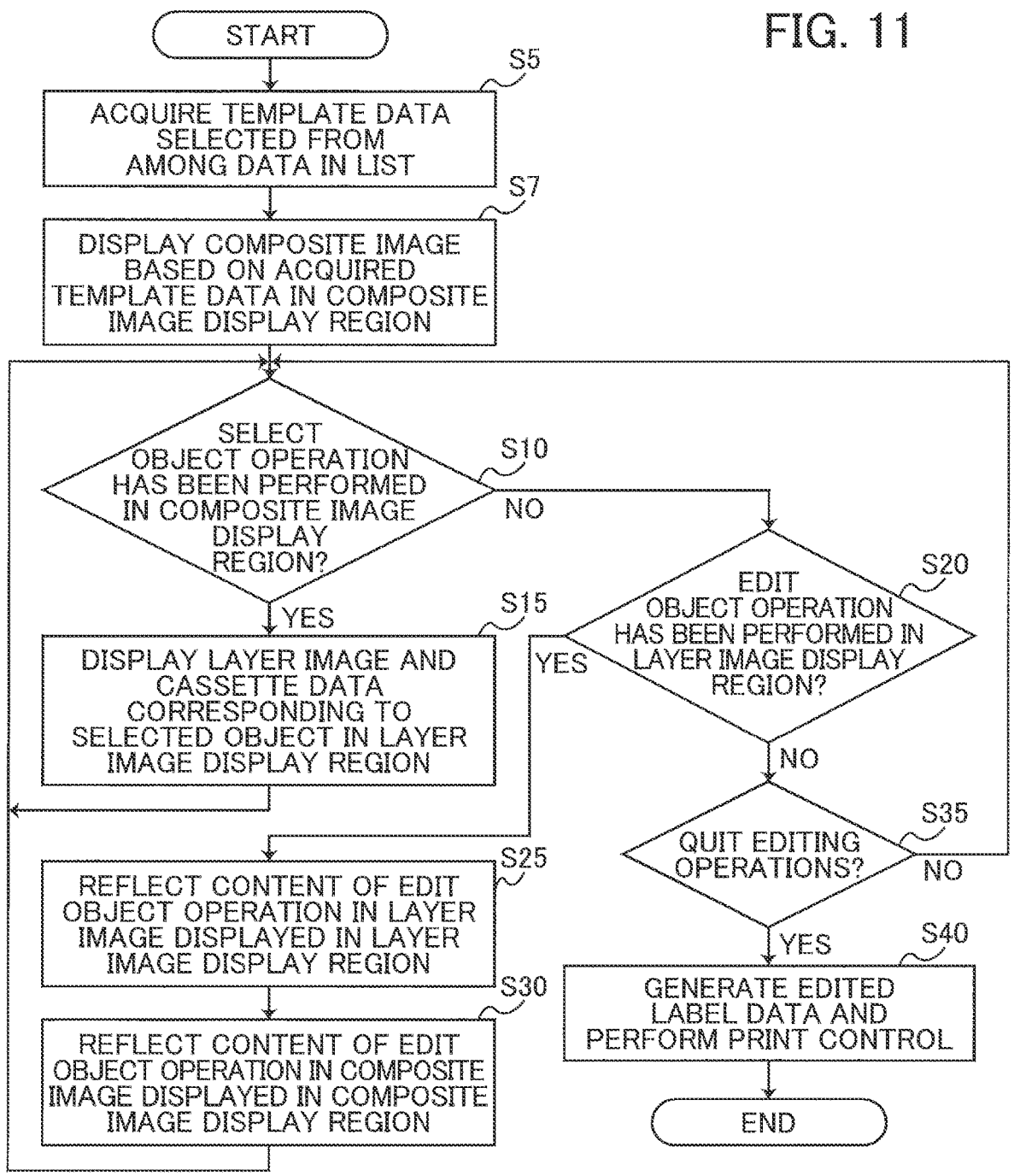
FIG. 11 is a flowchart illustrating steps in a process for displaying an editing screen on the mobile terminal and performing print control using composite label template data.

A sample control procedure executed by the CPU 31 of the mobile terminal 3 to implement the above-described method of the present embodiment will be described with reference to the flowchart in FIG. 11. This control procedure describes a process for performing print control to print edited label data using composite label template data. The following procedure begins once the print data editing program has been launched and the user has selected desired composite label template data from among a plurality of sets of composite label template data in a list.

In S5 the CPU 31 acquires the user-selected composite label template data from the high-capacity storage device 35.

In S7 the CPU 31 displays a composite image IS based on the acquired composite label template data in the composite image window 61 of the composite image display region GM on the touchscreen 33.

In S10 the CPU 31 determines whether the user has performed a select object operation in the composite image display region GM to select an object. Specifically, the CPU 31 determines whether any object in the composite image IS has been tapped. If a select object operation has been performed (S10: YES), the CPU 31 advances to S15.

In S15 the CPU 31 displays the layer image I1, I2, or I3 corresponding to the selected object and its cassette data in the layer image display region LM on the touchscreen 33. Subsequently, the CPU 31 returns to S10 and repeats the same procedure described above.

However, if a select object operation has not been performed in S10 (S10: NO), in S20 the CPU 31 determines whether the user has performed an edit object operation in the layer image display region LM to edit the object. If an edit object operation has been performed in the layer image display region LM (S20: YES), the CPU 31 advances to S25.

In S25 the CPU 31 displays in the layer image display region LM the content of the edit object operation received in S20 through the layer image display region LM. Specifically, the CPU 31 receives operations on nested submenus of the popup menu SN and the like and, based on these operations, reflects modifications to the object in the displayed layer image I1, I2, or I3.

In S30 the CPU 31 also reflects modifications made to the object through the edit object operations described above in the composite image IS displayed in the composite image display region GM. These modifications are reflected in the composite image is in real-flute. Subsequently, the CPU 31 returns to S10 and repeats the same procedure described above.

On the other hand, if the CPU 31 determines that no editing operation has been performed on the object in the layer image display region LM (820: NO), the CPU 31 advances to S35.

In S35 the CPU 31 determines whether the Quit button 63 has been pressed. In other words, in S35 the CPU 31 determines whether to quit editing operations. If the Quit button 63 has not been pressed (S35: NO), the CPU 31 returns to S10 and repeats the same procedure described above.

However, if the Quit button 63 has been pressed (S35: YES), the CPU 31 advances to S40.

In S40 the CPU 31 generates edited label data and performs print control to print the edited label data. Specifically, the CPU 31 outputs the edited label data to the label printer 2 via the communication control unit 34, and the label printer 2 executes printing operations based on the received label data to create print labels L. This completes the control procedure.

In the above description, the process of S5 is an example of the (a) acquiring of the present disclosure, and the process of S7, S15, and S25 is an example of the (b) displaying of the present disclosure. The process of S15 is example of the (d) identifying of the present disclosure, and the process of S40 is an example of the (d) controlling of the present disclosure.

<Effects of the Present Embodiment>

As described above in the present embodiment, composite label template data is prepared in advance and stored in the high-capacity storage device 35 for users to create composite labels LS. The composite label template data is configured of a plurality of sets of layer label data corresponding to a plurality of print labels L1, L2, and L3 used to create the composite label LS. After launching the print data editing program, in step S5 the CPU 31 of the mobile terminal 3 acquires the plurality of sets of layer label data corresponding to a desired composite label LS. In step S7 the CPU 31 displays on the touchscreen 33 a composite image IS configured by superimposing a plurality of layer images I1, I2, and I3 represented by the plurality of sets of layer label data in the acquired composite label template data. While viewing the displayed composite image IS, the user performs operations on the touchscreen 33 for editing the composite image IS. The CPU 31 receives these editing-related operations in steps S10 and S20. In step S15 the CPU 31 determines whether the operation received in step S10 has targeted the layer image I1, I2, or I3 and identifies the layer label data corresponding to the layer image as the editing target.

According to the present embodiment, by performing operations to edit individual layer label data while viewing the composite image IS configured of the plurality of layer images I1, I2, and I3 represented by the plurality of sets of acquired layer label data superimposed on each other, the user can intuitively perform editing operations while viewing the final appearance of the superimposed layer images I1, I2, and I3.

One feature of the present embodiment is that the layer image I1, I2, or I3 corresponding to the layer label data identified in S15 as the editing target is displayed on the touchscreen 33. Since the layer image I1, I2, or I3 related to the editing operation is displayed on the touchscreen 33 together with the composite image IS in the present embodiment, the user can more intuitively comprehend the effects of the editing operations being performed.

Note that the present embodiment describes one example of editing screens displayed on the touchscreen 33 of the mobile terminal 3. Since the display area and operation area in the touchscreen 33 of the mobile terminal 3 are relatively small, only the layer image I1, I2, or I3 corresponding to the selected target layer is displayed in the layer image display region LM. However, the user may be allowed to change the display through a prescribed operation to show only one of the composite image display region GM and layer image display region LM on the touchscreen 33. In this case, the plurality of layer images I1, I2, and I3 may be displayed simultaneously in the layer image display region LM. Further, since the label printer 2 is provided with the touchscreen 54, the control circuit 21 of the label printer 2 may execute the same print data editing program to employ the editing screen according to the present embodiment. More specifically, the control circuit 21 of the label printer 2 may execute the control procedure illustrated in FIG. 11. In this case, the label printer 2 performs the print control in S40 to create the print labels L1, L2, and L3.

Another feature of the present embodiment is that the composite image IS and the plurality of layer images I1, I2, or I3 corresponding to a plurality of sets of layer label data are displayed in steps S7 and S15. The user performs editing operations on the composite image IS displayed region LM the touchscreen 33. In step S25 the CPU 31 updates displayed content for the composite image IS in conformance with the user's editing operations on the layer images I1, I2, or I3. By updating the composite image IS according to the user's operations on the layer images I1, I2, or I3, the user can more intuitively perform editing operations while viewing the object being edited and the appearance of the composite image IS in which the edited content is reflected.

Another feature of the present embodiment is that prescribed cassette data is associated with the composite label template data in advance. In step S15 the CPU 31 displays the cassette data for the acquired composite label template data on the touchscreen 33. In the present embodiment, the user can reliably learn the types of cartridges 101 pre-associated with each of the layer images I1, I2, and I3 in the composite label template data currently being used. Note that instead of displaying only cassette data corresponding to the layer currently being edited as in the present embodiment, all available cassette data may be displayed in the layer image display region LM.

Another feature of the present embodiment is that prescribed cassette data is pre-associated with the composite label template data. If the CPU 31 receives an instruction in step S20 to modify a color in the associated cassette data, the corresponding color in the layer image I1, I2, or I3 associated with the cassette data being modified is changed to the color specified in the modification command.

When the user modifies colors in cassette data pre-associated with the composite label template data as described above in the present embodiment, the colors in the layer images I1, I2, and I3 corresponding to the modified cassette data are changed in the display to reflect the modifications. Thus, the user can more intuitively perform editing operations while viewing the appearance of images reflecting the modification content.

Second Embodiment

Next, an example according to a second embodiment of the present disclosure will be described. Note that a description of structures and processes similar to those in the first embodiment will be omitted as appropriate.

The first embodiment described above assumes use of the mobile terminal 3 and/or the label printer 2, whereby only one of the layer images I1, I2, and I3 selected as the editing target is displayed in the layer image display region LM of the editing screen on the touchscreen 33. The present embodiment, on the other hand, assumes use of the operation terminal 4. Since the display unit 44 of the operation terminal 4 has a relatively expansive display area, all of the layer images I1, I2, and I3 are displayed simultaneously in a juxtaposed arrangement within the layer image display region LM of the editing screen. According to an aspect of the present embodiment, editing operations by the user are received in the composite image display region GM and display updates based on those editing operations are reflected in the corresponding layer images I1, I2, and I3.

Figure 12:
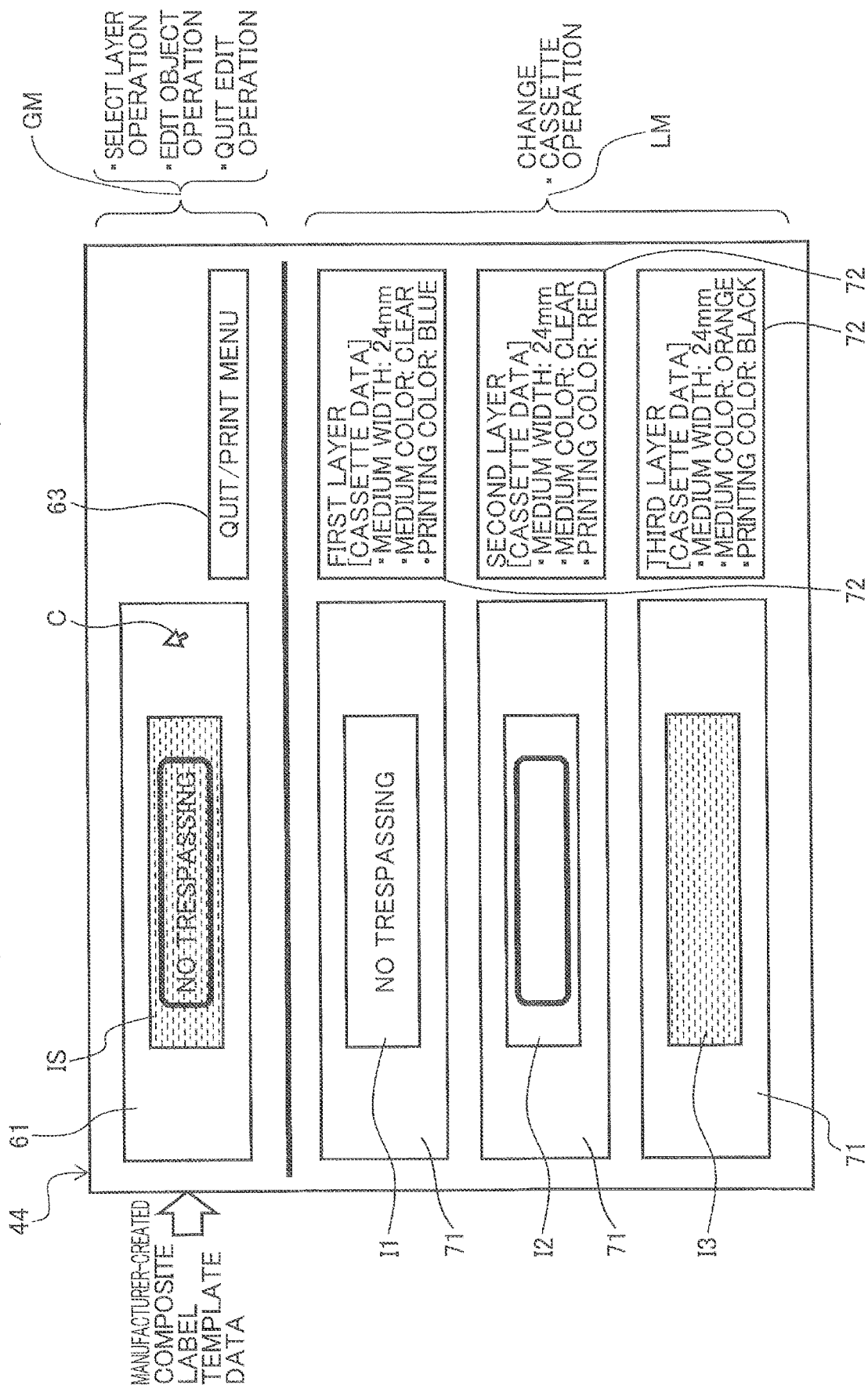
FIG. 12 is an explanatory diagram illustrating an example of an editing screen displayed on the operation terminal when composite label template data is acquired.

In this case, an editing screen such as that shown in FIG. 12 is displayed on the display unit 44 when composite label template data is acquired. The composite image display region GM is displayed in this editing screen, as in the first embodiment described above. Further, the layer images I1, I2, and I3 corresponding to all three sets of layer label data (see FIG. 4B) configuring the acquired composite label template data are all displayed together with the corresponding cassette data in the layer image display region LM. Although not shown in the drawing, the sets of layer label data may be displayed so as to be scrollable in the layer image display region LM when the number of sets is large.

Figure 13:
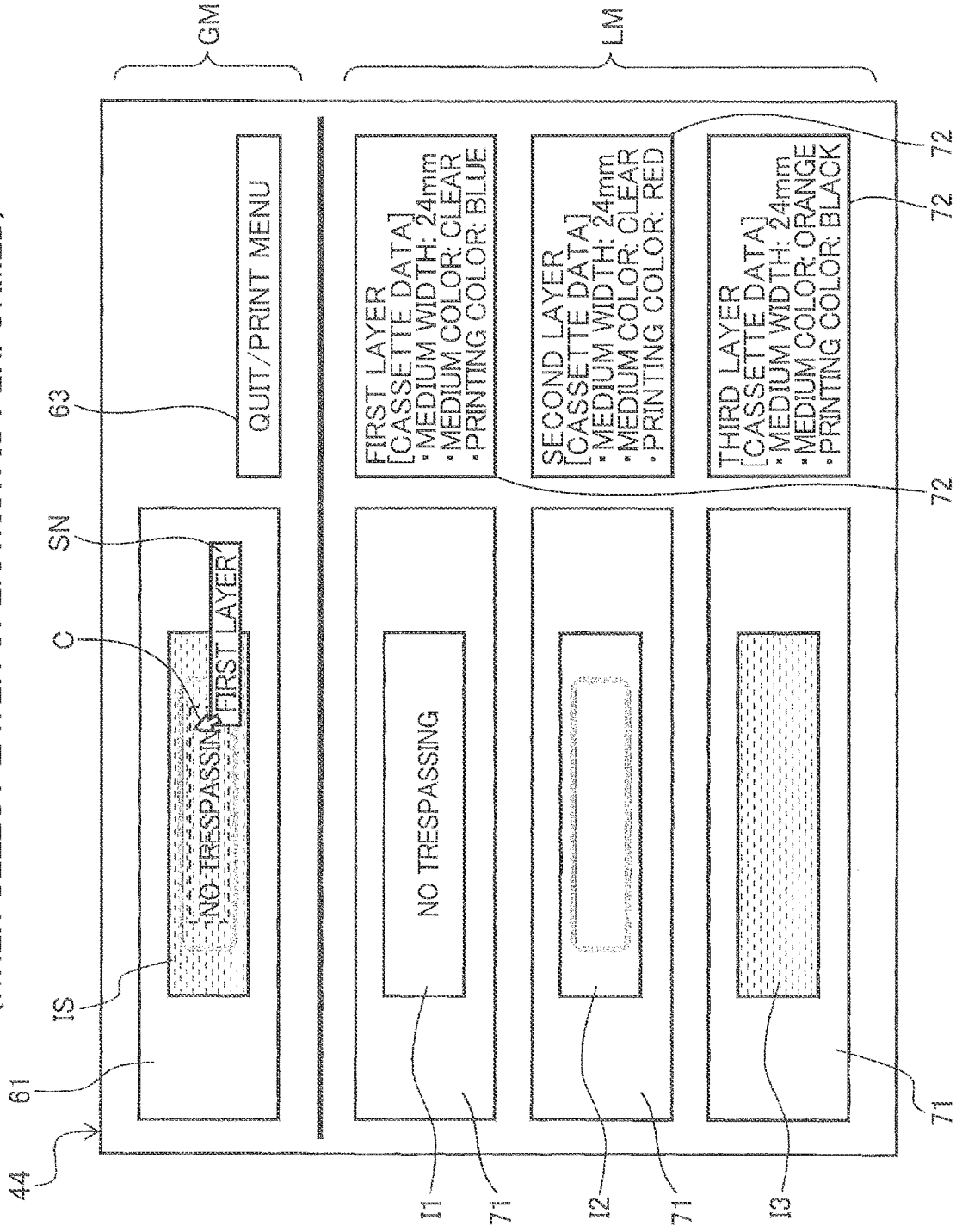
FIG. 13 is an explanatory diagram illustrating an example of an editing screen displayed on the operation terminal when a select layer operation is performed for the first layer.
Figure 14:
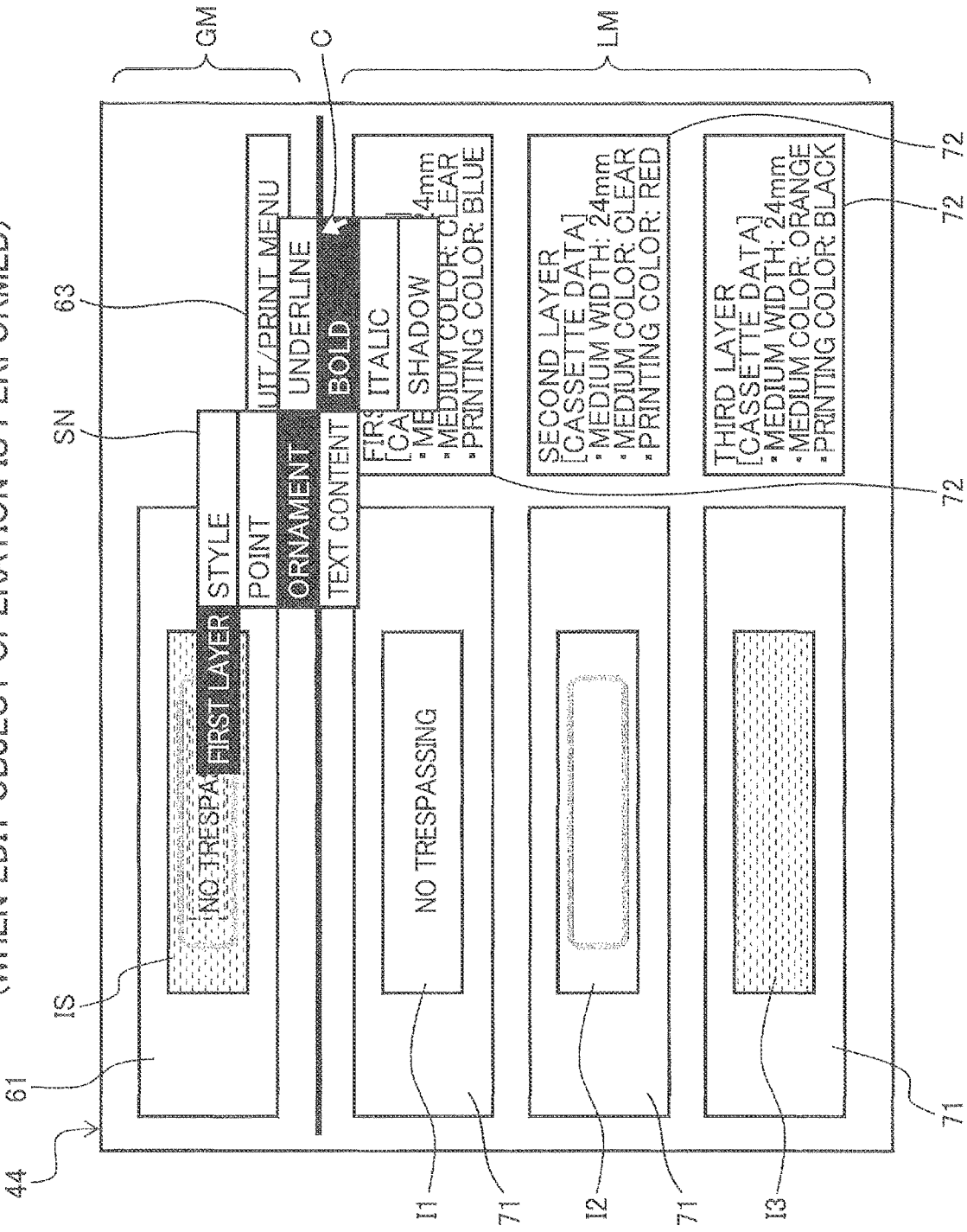
FIG. 14 is an explanatory diagram illustrating an example of an editing screen displayed on the operation terminal when an edit object operation is performed for the first layer.

When the user performs a select layer operation in the composite image display region GM to select a layer in the present embodiment, all objects and their corresponding layer images I1, I2, and I3, except for the selected object and its corresponding layer image, are displayed with low contrast, as illustrated in FIG. 13. In the example of FIG. 13, the user has selected text object, and the corresponding layer image is the first-layer image I1. Thus, in the editing screen illustrated in FIG. 13, the second-layer image I2 and third-layer image I3 are displayed with low contrast. In this way, the selected object and its corresponding layer image I1, I2, or I3 (in this case, the first-layer image I1) are relatively emphasized in the display. As shown in FIG. 14, edit object operations to edit an object by navigating through a popup menu and its submenus can be performed in the present embodiment. Since edit object operations are performed on the composite image IS in this embodiment, the popup menu SN is displayed in the composite image display region GM. Modification content from the editing operations is reflected in real-time in the layer images I1, I2, and I3 corresponding to the edited object. Note that if a prescribed time elapses after ending edit object operations, the low contrast display is cancelled and all objects, the composite image IS, and the layer images I1, I2, and I3 are displayed with the same contrast, <Control Procedure>

A sample control procedure executed by the CPU 41 of the operation terminal 4 to implement the method described above for the present embodiment will be described with reference to the flowchart in FIG. 15. This control procedure begins once the print data editing program has been launched and the user has selected desired composite label template data from among a plurality of sets of composite label template data in a list.

Figure 15:
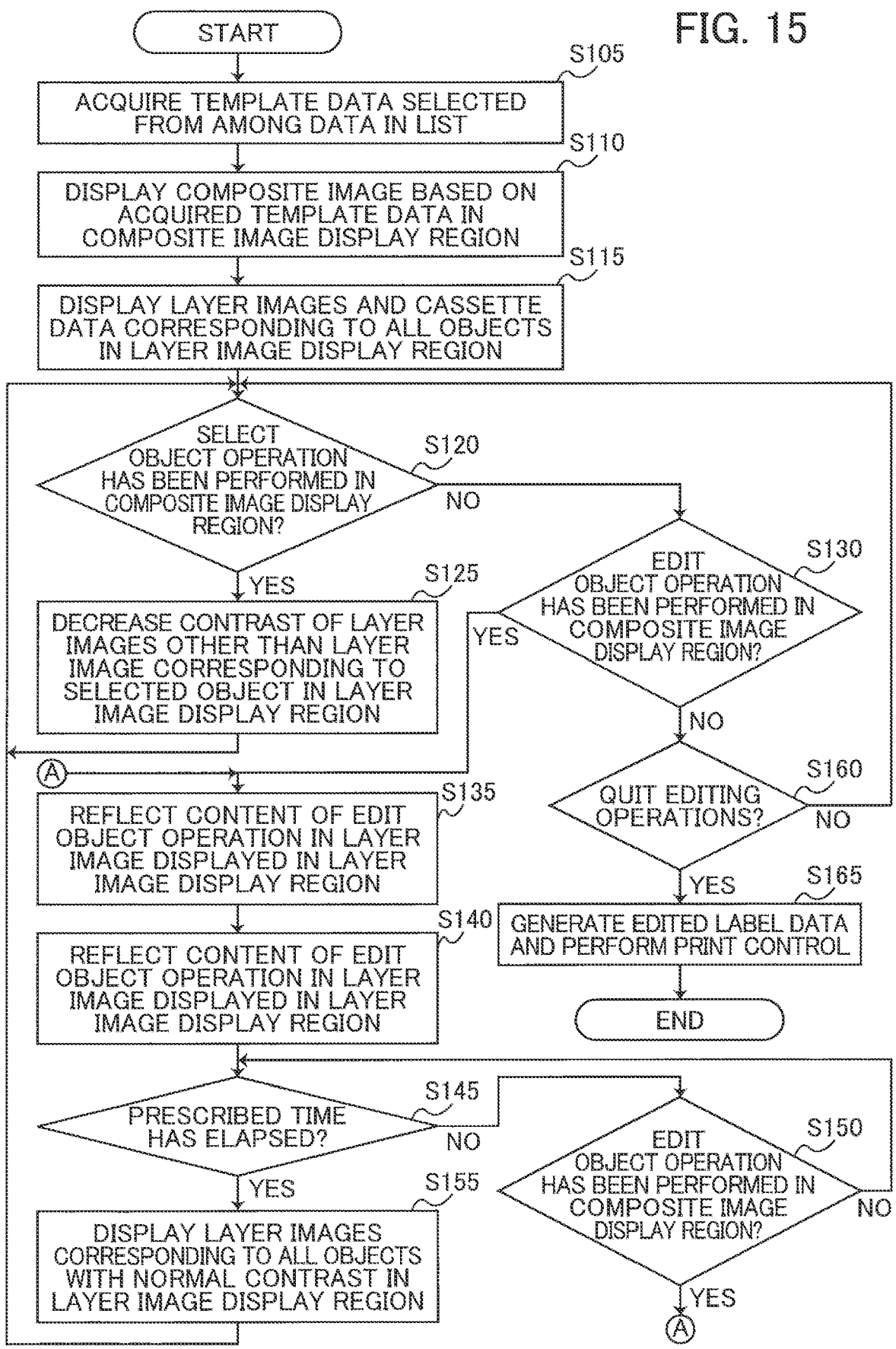
FIG. 15 is a flowchart illustrating steps in a process for displaying an editing screen on the operation terminal and performing print control using the composite label template data.

In S105 of FIG. 15, the CPU 41 acquires previously selected composite label template data from the high-capacity storage device 46. In S110 the CPU 41 displays a composite image IS based on this composite label template data in the composite image window 61 of the composite image display region GM.

In S115 the CPU 41 displays the layer images I1, I2, and I3 corresponding to all sets of layer label data (described using objects in place of layers in the flowchart and the following description thereof) included in the composite label template data together with their cassette data as a list in the layer image display region LM.

Thereafter, in S120 the CPU 41 determines whether the user has performed a select object operation to select an object on the composite image IS displayed in the composite image display region GM. Specifically, if a cursor C is moved to a position overlapping a specific object, a popup menu SN for the corresponding layer number is successively displayed. The CPU 41 determines whether a press gesture is performed while this layer number is displayed. If the CPU 41 determines that a select object operation has been performed (S120: YES), the CPU 41 advances to S125.

In S125 the CPU 41 displays all objects and layer images I1, I2, and I3 other than the selected object and its corresponding layer image with low contrast. In other words, in S125 the CPU 41 decreases the contrast of layer images other than the layer image corresponding to the selected object among all layer images I1, I2, and I3 displayed in the layer image display region LM. Specifically, in the example of FIG. 13, the CPU 41 decreases the contrast of the second-layer image I2 and third-layer image I3 other than the first-layer image I1 corresponding to the selected text object. Subsequently, the CPU 41 returns to S120 and repeats the same procedure described above.

However, if the CPU 41 determines that no operation has been performed to select an object (S120: NO), in S130 the CPU 41 determines whether the user has performed an edit object operation in the composite image display region GM to edit an object. Specifically, the CPU 41 determines whether an edit object operation has been performed on the object in the layer image previously selected in S120. Note that edit object operations are accepted only after the select object operation is performed. If the CPU 41 determines that an edit object operation has been performed in the composite image display region GM (S130: YES), the CPU 41 advances to S135.

In S135 the CPU 41 displays the content of the edit object operation received in the composite image display region GM. Specifically, the CPU 41 receives operations for navigating through the popup menu SN and its submenus and, based on these operations, reflects modifications made to an object in the composite image IS.

In S140 modifications to objects indicated through edit object operations are also reflected in the corresponding layer images I1, I2, or I3 displayed in the layer image display region LM. These modifications are reflected in the layer image in real-time.

In S145 the CPU 41 determines whether a prescribed time or more has elapsed since the edit object operation was completed. If the prescribed time has not elapsed (S145: NO), in S150 the CPU 41 determines whether the user has performed an operation in the composite image display region GM to edit an object. If an edit object operation has been performed in the composite image display region GM (S150: YES), the CPU 41 returns to S135 and repeats the same procedure described above. However, if an edit object operation has not been performed in the composite image display region GM (S150: NO), the CPU 41 returns to S145 and repeats the same procedure described above.

On the other hand, if the CPU 41 determines in S145 that the prescribed time has elapsed (S145: YES), the CPU 41 advances to S155.

In S155 the CPU 41 displays the composite image IS, and the layer images I1, I2, and I3 corresponding to all objects with normal contrast. Subsequently, the CPU 41 returns to S120 and repeats the same procedure described above.

If the CPU 41 determines in S130 that an editing operation has not been performed on an object in the composite image display region GM (S130: NO), the CPU 41 advances to S160.

In S160 the CPU 41 determines whether the Quit button 63 has been pressed. In other words, in S160 the CPU 41 determines whether to quit editing operations. If the Quit button 63 has not been pressed (S160: NO), the CPU 41 returns to S120 and repeats the same procedure described above.

However, if the Quit button 63 has been pressed (S160: YES), the CPU 41 advances to S165.

In S165 the CPU 41 generates edited label data and performs print control based on the edited label data. Specifically, the CPU 41 outputs the edited label data to the label printer 2 via the communication control unit 45, and the Label printer 2 executes printing operations based on the received label data to create print labels L. This completes the control procedure in FIG. 15.

As described above in the present embodiment, when the user selects an object in the composite image, in step S125 the CPU 41 emphasizes the display of the object targeted in this editing operation relative to the other objects. By making the selected object stand out visually from the other objects, the display can be made more visually comprehensible to the user.

Third Embodiment

Next, an example according to a third embodiment of the present disclosure will be described. Note that a description of structures and processes similar to those in the embodiments described above will be omitted as appropriate.

As in the second embodiment, both the composite image display region GM and the layer image display region LM including each of the layer images I1, I2, and I3 corresponding to the plurality of sets of label data in the composite label template data are displayed in a single screen in the third embodiment. As in the first embodiment, editing operations in the third embodiment are performed in the layer image display region LM.

Here, the same editing screen as that shown in FIG. 12 is displayed on the display unit 44 when the CPU 41 acquires composite label template data. Since each of the layer images I1, I2, and I3 is already displayed in the layer image display region LM of the present embodiment when a layer selection operation is performed in the displayed editing screen, the user need not press on a specific object in the composite image IS. As shown in FIG. 16, the user can directly select a layer by moving the cursor C to the display region of the desired layer image I1, I2, or I3 displayed in the layer image display region LM and performing a press gesture. As shown in FIG. 17, the user Can directly edit an object for one of the layer images I1, I2, and I3 in the present embodiment, and the modified content will be reflected in the composite image IS in real-time. When the user selects a layer in the present embodiment, the composite image IS is displayed so that objects corresponding to layer images of unselected layers have a lower contrast than objects corresponding to the layer image of the selected layer. In other words, the object in the composite image IS targeted for editing operations is emphasized relative to other objects.

<Control Procedure>

A sample control procedure executed by the CPU 41 of the operation terminal 4 to implement the method described above in the present embodiment will be described with reference to the flowchart in FIG. 18. This control procedure begins once the print data editing program has been launched and the user has selected desired composite label template data from among a plurality of sets of composite label template data in a list.

Figure 18:
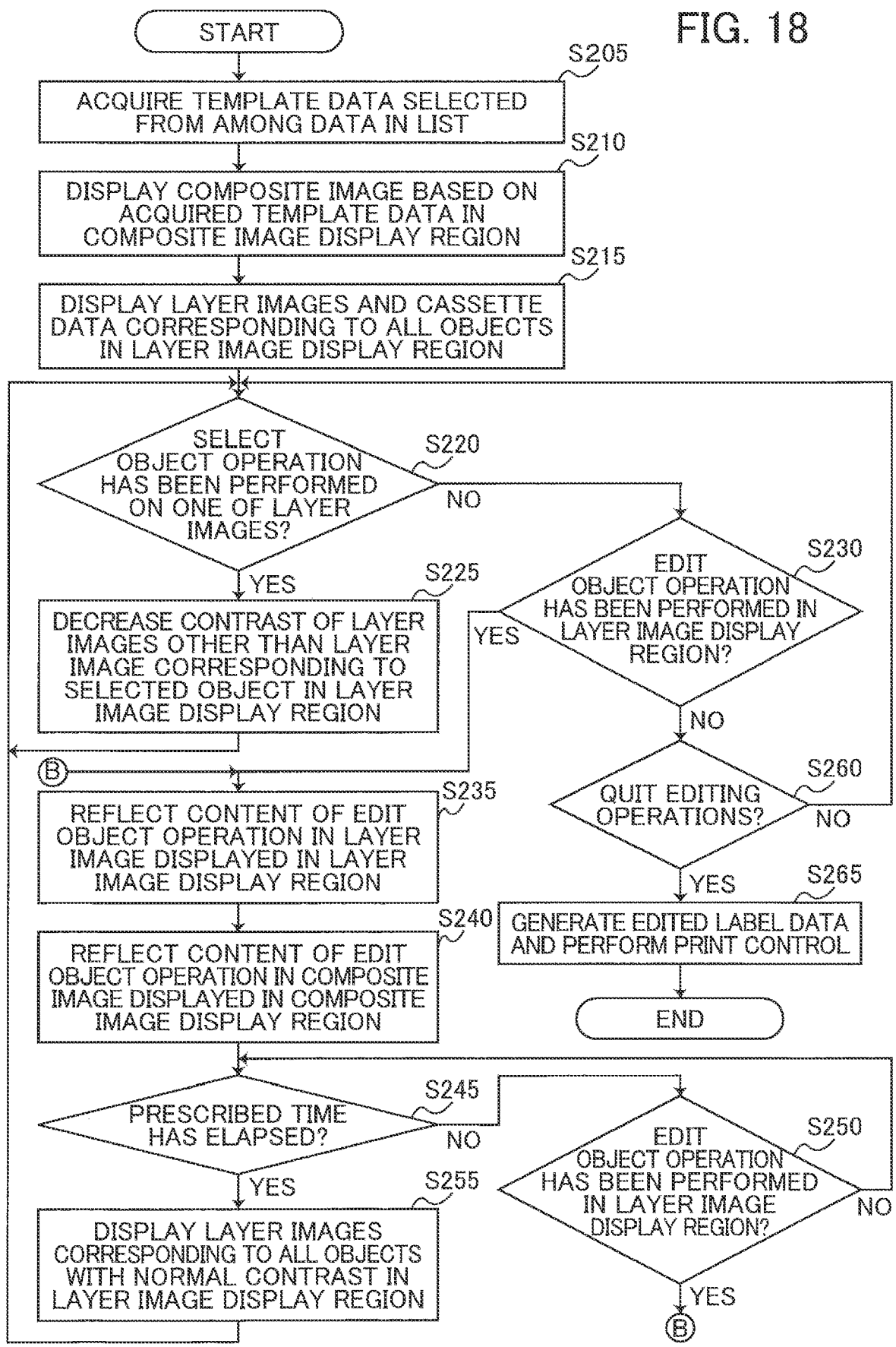
FIG. 18 is a flowchart illustrating steps in a process for displaying an editing screen on the operation terminal and performing print control using the composite label template data.

In S205 at the beginning of the process in FIG. 18, the CPU 41 acquires previously selected composite label template data from the high-capacity storage device 46. In S210 the CPU 41 displays a composite image IS based on this composite label template data in the composite image window 61 of the composite image display region GM.

In S215 the CPU 41 displays the layer images I1, I2, and I3 corresponding to all sets of layer label data (described using objects instead of layers in the flowchart and the following description thereof) included in the composite label template data together with their cassette data as a list in the layer image display region LM.

Thereafter, in S220 the CPU 41 determines whether the user has performed a select object operation on one of the layer images I1, I2, and I3 displayed in the layer image display region LM. Specifically, when a cursor C is moved to a position overlapping a specific object, a popup menu SN for the corresponding layer number is successively displayed. The CPU 41 determines whether a press gesture is performed while this layer number is displayed. If the CPU 41 determines that a select object operation has been performed (S220: YES), the CPU 41 advances to S225.

In S225 the CPU 41 displays all objects and layer images I1, I2, and I3 other than the selected object and its corresponding layer image with low contrast. In other words, in S225 the CPU 41 decreases the contrast of layer images other than the layer image corresponding to the selected object among all layer images I1, I2, and I3 displayed in the layer image display region LM. Specifically, in the example of FIG. 16, the CPU 41 decreases the contrast of the first- and third-layer images I1 and I3 other than the second-layer image I1 corresponding to the selected graphic object. Subsequently, the CPU 41 returns to S220 and repeats the same procedure described above.

However, if an operation has not been performed to select an object (S220: NO), in S230 the CPU 41 determines whether the user has performed an operation to edit an object in the layer image display region LM. Specifically, the CPU 41 determines whether an edit object operation has been performed on the object in the layer image previously selected in S220. Note that edit object operations are accepted only after the select object operation is perforated. If an edit object operation has been performed in the layer image display region LM (S230: YES), the CPU 41 advances to S235.

In S235 the CPU 41 displays the content of the edit object operation received in the layer image display region LM. Specifically, the CPU 41 receives operations for navigating through the popup menu SN and its submenus and reflects modifications made to the object based on these operations in the corresponding layer image I1, I2, or I3. In the example of FIG. 17, the graphic of the square border with rounded corners is modified into the selected pattern in the second-layer image I2.

In S240 the CPU 41 also reflects modifications to the object indicated through the edit object operation in the composite image IS displayed in the composite image display region GM. These modifications are reflected in real-time.

In S245 the CPU 41 determines whether a prescribed time or greater has elapsed since the editing operation on the object was completed. If the prescribed time has not elapsed (S245: NO), in S250 the CPU 41 determines whether the user has performed an edit object operation on the object in the layer image display region LM. If an edit object operation has been performed in the layer image display region LM on the object (S250: YES), the CPU 41 returns to S235 and repeats the same procedure described above. However, if an edit object operation on the object has not been performed in the layer image display region LM (S250: NO), the CPU 41 returns to S245 and repeats the same procedure described above.

However, if the CPU 41 determines that the prescribed time has elapsed (S245; YES), the CPU 41 advances to S255.

In S255 the CPU 41 displays the composite image IS, and the layer images I1, I2, and I3 corresponding to all objects with normal contrast. Subsequently, the CPU 41 returns to S220 and repeats the same procedure described above.

On the other hand, if the CPU 41 determines in S230 that an edit object operation has not been performed on the object in the layer image display region LM (S230: NO), the CPU 41 advances to S260.

In S260 the CPU 41 determines whether the Quit button 63 has been pressed. In other words, in S260 the CPU 41 determines whether to quit editing operations. In the Quit button 63 has not been pressed (S260: NO), the CPU 41 returns to S220 and repeats the same procedure described above.

However, if the Quit button 63 has been pressed (S260: YES), the CPU 41 advances to S265.

In S265 the CPU 41 generates edited label data and performs print control based on the edited label data. Specifically, the CPU 41 outputs the edited label data to the label printer 2 via the communication control unit 45, and the label printer 2 executes printing operations based on the received label data to create print labels L. This completes the control procedure in FIG. 18.

As described above in the present embodiment, the user performs edit object operations on the layer images I1, I2, and I3 displayed on the display unit 44. In step S240 the CPU 41 updates display content for the composite image IS based on editing operations the user performed on objects in the layer images I1, I2, and I3. By updating the composite image IS based on the user's operations on the layer images I1, I2, and I3, the user can perform more intuitive editing operations while viewing the appearance of the composite image IS in which the editing content is reflected.

Fourth Embodiment

Next, an example according to a fourth embodiment of the present disclosure will be described. Note that a description of structures and processes similar to those in the embodiments described above will be omitted as appropriate.

The descriptions of the above embodiments focus on the process for editing composite label template data and printing print labels L based on the edited label data. In the present embodiment, the print data editing program enables the user to edit each set of layer label data in order to create a composite label from scratch. Further, each set of layer label data created by the user is saved in the high-capacity storage devices 35, 46, and 55 so that the data can be read and edited at a later time.

Figure 19:
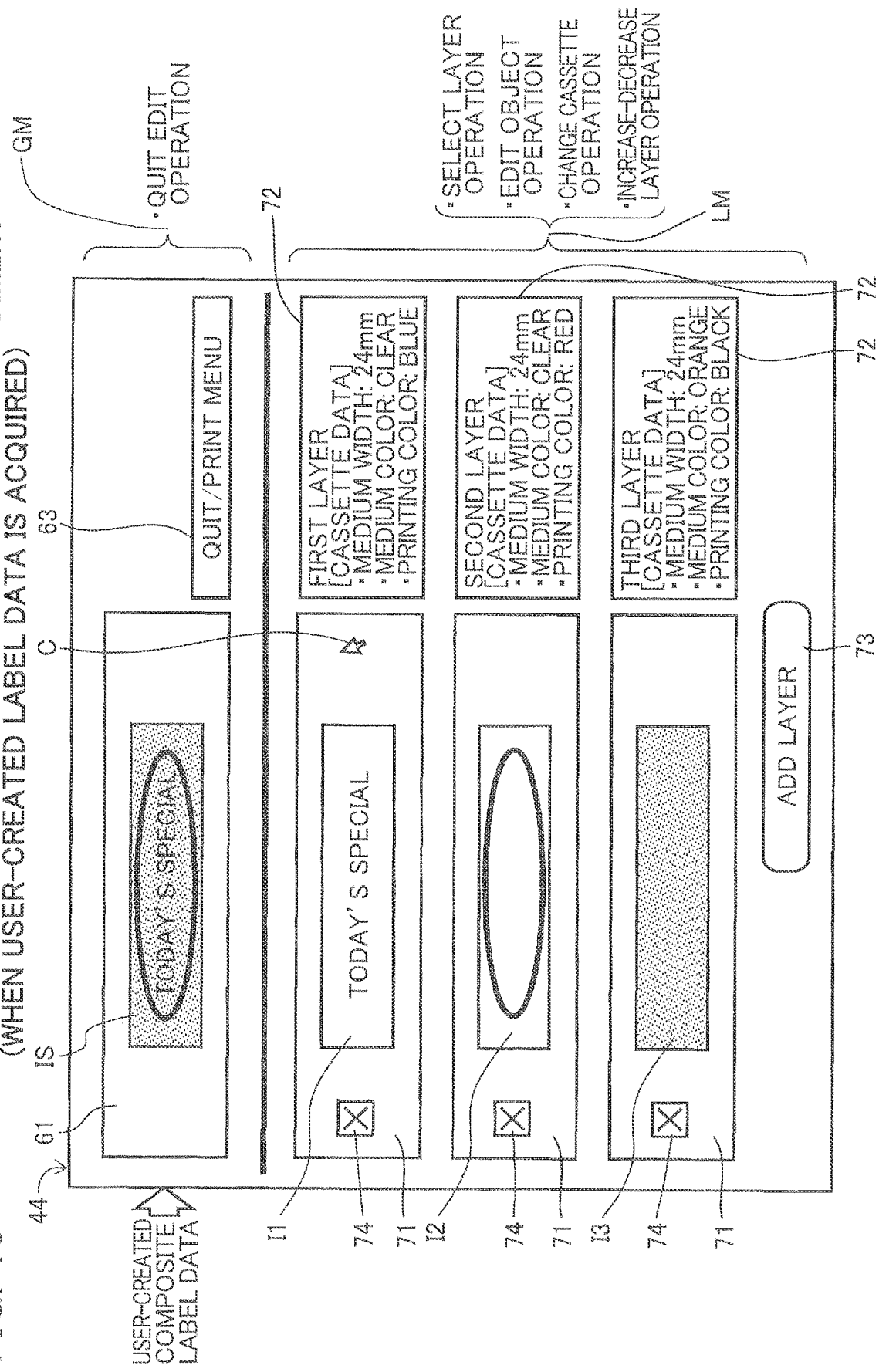
FIG. 19 is an explanatory diagram illustrating an example of an editing screen displayed on the operation terminal when user-created composite label data is acquired.

FIG. 19 shows an example of an editing screen in which the user creates composite label data. While the aspect of displaying the composite image display region. GM and layer image display region LM in the editing screen is identical to that of the editing screen used when editing begins with composite label template data, the layer image display region LM in this embodiment differs with the inclusion of an Add Layer button 73, and a Delete Layer button 74 for each of the layer images I1, I2, and I3. By displaying the Add Layer button 73 and a Delete Layer button 74 for each of the layer images I1, I2, and I3 in the layer image display region LM, the user can perform operations in this editing screen to increase and decrease the number of layers (increase-decrease layer operation). Blank composite label data provided with a single set of blank layer label data having no objects may be prepared for creating a new composite label. While not shown in the drawings, the editing screen displayed when this blank composite label data is acquired includes one each of a blank composite image IS and a blank layer image IL Additionally, the Add Layer button 73 and Delete Layer button 74 are operably displayed in the layer image display region LM. Unlike when using prepared template data, the user has a high degree of freedom when editing composite label data in this editing screen, with greatly reduced restrictions on the data items the user can modify and the allowable ranges of modifications.

With user-created composite label data, the user is free not only to modify the number of layers but to modify their order and to change the type of object being printed in each layer. Thus, manufacturer-created composite label template data and user-created composite label data may have different allowable ranges of editing, and these editable ranges may be switched based on the type of composite label data acquired. Note that the user-created composite label data is an example of the editable data of the present disclosure, and the manufacturer-created composite label template data is an example of the template data of the present disclosure. The plurality of sets of layer label data configuring the manufacturer-created composite label template data is an example of the plurality of sets of first image data of the present disclosure, and the plurality of sets of layer label data configuring the user-created composite label data is an example of the plurality of sets of second image data of the present disclosure. The modification of the layer number is an example of the changing the number of the plurality of sets of image data of the present disclosure.

<Control Procedure>

Figure 20:
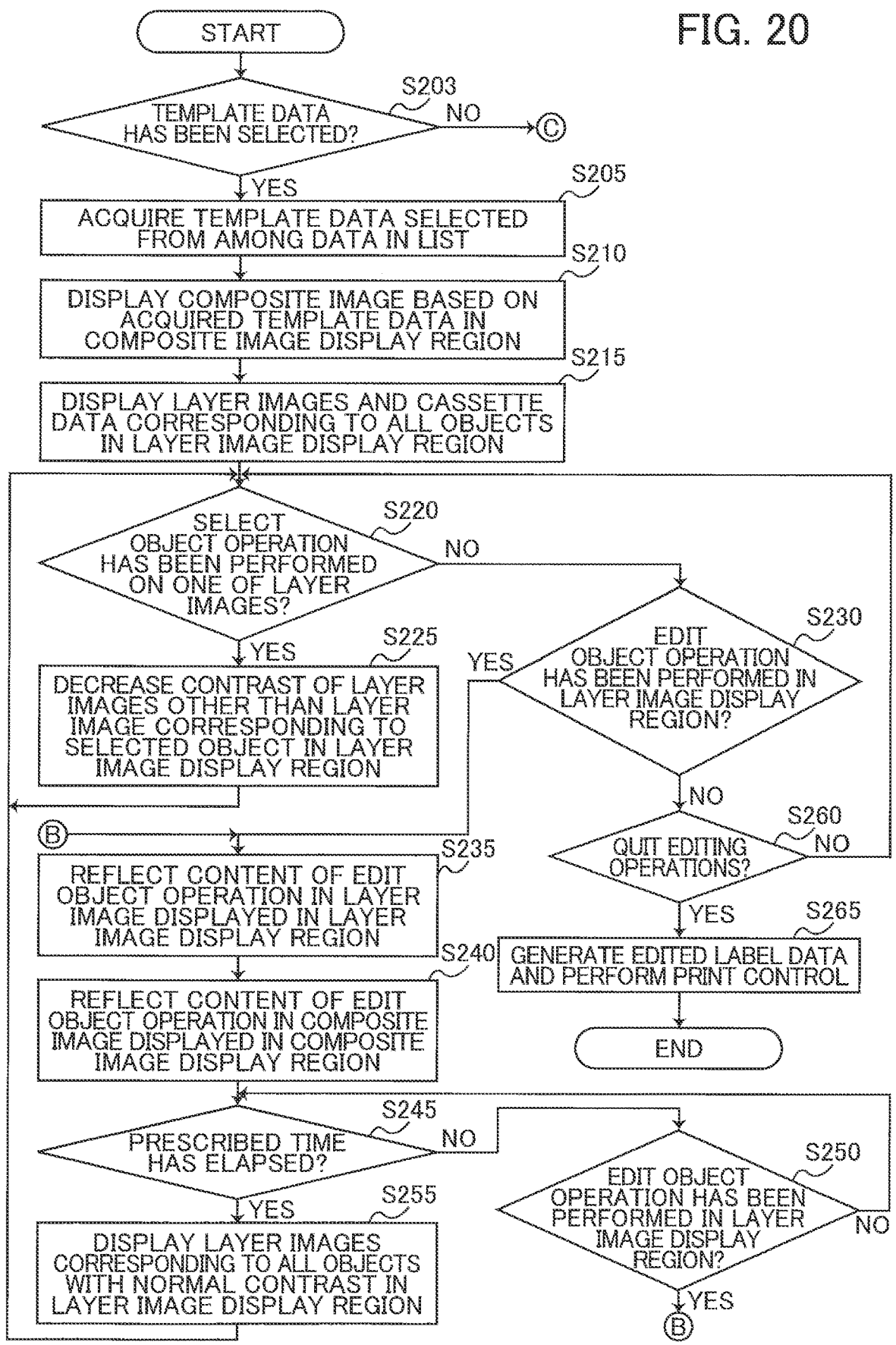
FIG. 20 is a flowchart illustrating steps in a part of a process for displaying an editing screen on the operation terminal and performing print control by selecting one of options of using the composite label template data, creating new composite label data, and reading and editing the user-created composite label data.
Figure 21:
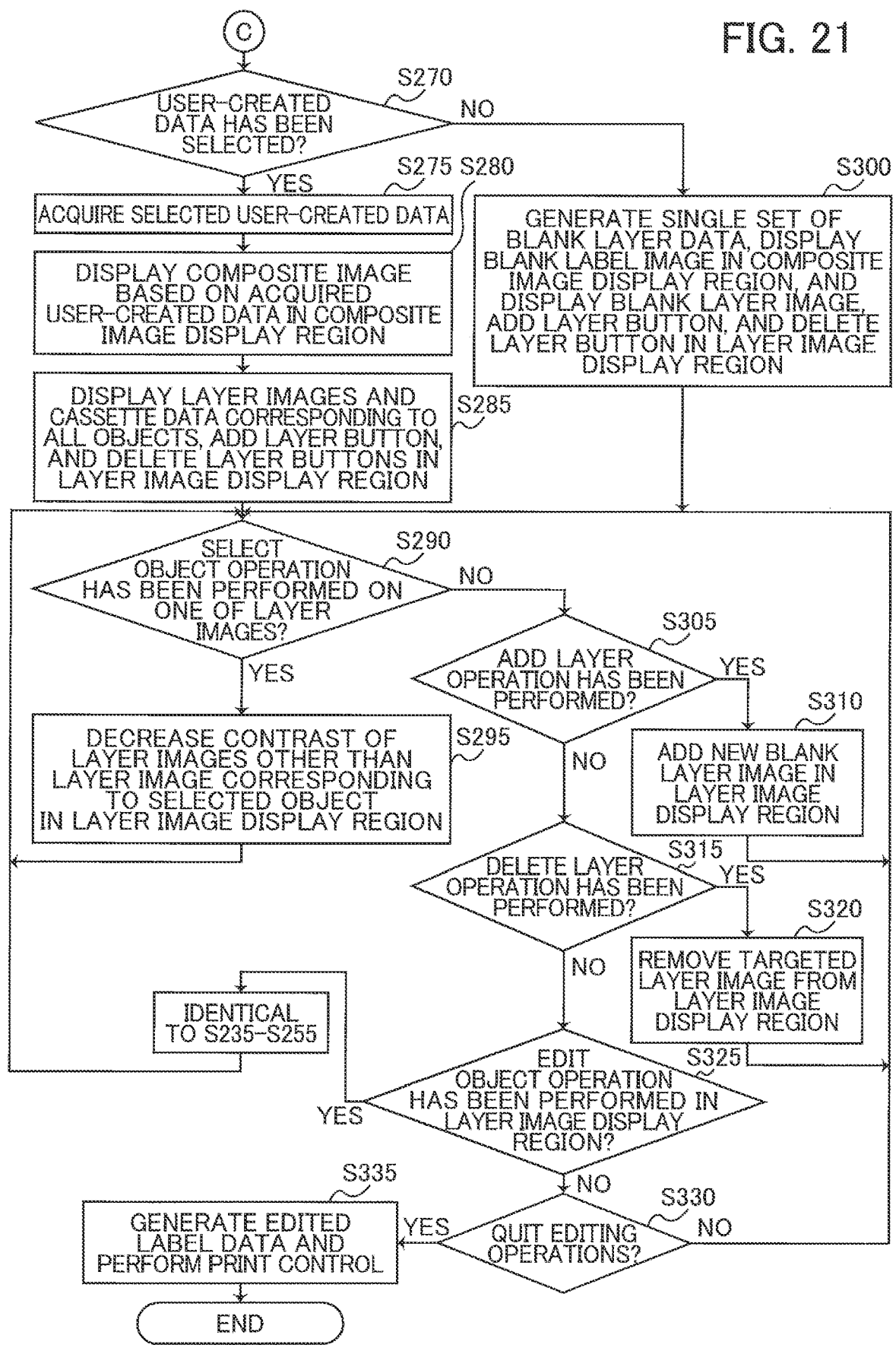
FIG. 21 is a flowchart illustrating steps in a remaining part of the process for displaying an editing screen on the operation terminal and performing print control by selecting one of the options of using the composite label template data, creating new composite label data, and reading and editing the user-created composite label data.

An example of the control procedure executed by the CPU 41 of the operation terminal 4 to implement the method described above in the present embodiment will be described with reference to the flowcharts in FIGS. 20 and 21. Note that the following description covers only those steps that differ from the flowchart in FIG. 18 described above and will omit a description of similar steps.

The print data editing program prompts the user for editing complete label data to be printed to select one of the options of using composite label template data, creating new composite label data, and reading and editing composite label data previously created by the user. In S203 at the beginning of FIG. 20, the CPU 41 determines whether the user has selected one of the sets of composite label template data. In such cases, the user will edit composite label data using the composite label template data. Accordingly, when the user has selected composite label template data (S203: YES), the CPU 41 performs the same steps S205 through S265 in FIG. 18. A description of these steps will not be repeated.

However, if the user has selected the option to read composite label data previously created by the user or the option to create new composite label data (S203: NO), the CPU 41 advances to S270 in FIG. 21.

In S207 the CPU 41 determines whether the user has selected the option to read and edit composite label data previously created by the user, i.e., user-created composite label data. When the user has selected the option to read and edit previously created composite label data (S270: YES), in S275 the CPU 41 acquires user-created composite label data selected by the user from the high-capacity storage device 46. In S280 the CPU 41 displays a composite image IS based on the acquired composite label data in the composite image window 61 of the composite image display region GM.

In S285 the CPU 41 displays the layer images I1, I2, and I3 corresponding to all sets of layer label data (described using objects instead of layers in the flowchart and the following description thereof) included in the composite label data together with their cassette data as a list in the layer image display region LM. In S285 the CPU 41 also displays the Add Layer button 73 and Delete Layer buttons 74 in the layer image display region LM. Subsequently, the CPU 41 advances to S290.

However, if the user has selected the option to create a new composite label data (S270: NO), in S300 the CPU 41 generates a single set of blank layer data having no objects and displays both the composite image display region GM and the layer image display region LM in a blank state. In S300 the CPU 41 also displays the Add Layer button 73 and Delete Layer button 74 in the layer image display region LM. More specifically, the CPU 41 displays in the composite image display region GM a blank label image based on the generated blank layer data. The CPU 41 also displays in the layer image display region LM a blank layer image, which is the same as the blank label image displayed in the composite image display region GM, together with the Add Layer button 73 and Delete Layer button 74. Subsequently, the CPU 41 advances to S290.

In S290 the CPU 41 determines whether the user has performed a select object operation on one of the layer images I1, I2, and I3 displayed in the layer image display region LM.

When the CPU 41 determines in S290 that a select object operation has been performed (S290: YES), in S295 the CPU 41 displays all objects and layer images I2, and I3 other than the selected object and its corresponding layer image with low contrast. In other words, in S295 the CPU 41 decreases the contrast of layer images other than the layer image corresponding to the selected object among all layer images I1, I2, and I3 displayed in the layer image display region LM. Subsequently, the CPU 41 returns to S290 and repeats the same procedure described above.

However, if the CPU 41 determines in S290 that no select object operation has been performed (S290: NO), the CPU 41 advances to S305.

In S305 the CPU 41 determines whether an add layer operation has been performed. That is, the CPU 41 determines whether a press gesture is performed when the cursor C is overlapping the Add Layer button 73. If an add layer operation has been performed (S305: YES), in S310 the CPU 41 adds a new blank layer. Specifically, in S310 the CPU 41 add a new blank layer image and a corresponding Delete Layer button 74 in the layer image display region LM. Subsequently, the CPU 41 returns to S290.

However, if an add layer operation has not been performed (S305: NO), the CPU 41 advances to S315.

In S315 the CPU 41 determines whether a delete layer operation has been performed. That is, the CPU 41 determines whether a press gesture is performed when the cursor C is overlapping any of the Delete Layer buttons 74. If a delete layer operation has been performed (S315: YES), in S320 the CPU 41 removes the targeted layer image I1, or I3 from the layer image display region LM, deletes the corresponding layer label data, and returns to S290. Specifically, the CPU 41 deletes the layer label data corresponding to the targeted layer image I1, I2, or I3 from the high-capacity storage device 46.

However, if a delete layer operation has not been performed (S315: NO), in S325 the CPU 41 determines whether the user has performed an edit object operation in the layer image display region LM. When an edit object operation has been performed in the layer image display region LM (S325: YES), the CPU 41 performs the process in steps S235-S255. Since the process in S235 through S255 is identical to that described in FIG. 18, a description of this process will not be repeated. Subsequently, the CPU 41 returns to S290 and repeats the same procedure described above.

However, if an edit object operation has not been performed in the layer image display region LM (S325: NO), the CPU 41 advances to S330.

In S330 the CPU 41 determines whether the Quit button 63 has been pressed. In other words, in S330 the CPU 41 determines whether to quit editing operations. If the Quit button 63 has not been pressed (S330: NO), the CPU 41 returns to S290 and repeats the same procedure described above.

However, if the Quit button 63 has been pressed (S330: YES), the CPU 41 advances to S335.

In S335 the CPU 41 generates edited label data and performs print control based on the edited label data. Specifically, the CPU 41 outputs the edited label data to the label printer 2 via the communication control unit 45, and the label printer 2 executes printing operations based on the received label data to create print labels L. This completes the control procedure in FIGS. 20 and 21.

Note that the process of S205 is an example of the (a) acquiring of the present disclosure, and the process of S275 is an example of the (b) acquiring of the present disclosure. The process of S230, S325, and S305 through S320 is an example of the (e) editing of the present disclosure.

As described above in the present embodiment, composite label template data is prepared and stored in the high-capacity storage device 46 for users to create composite labels LS. The composite label template data is configured of a plurality of sets of layer label data corresponding to a plurality of layer print labels L1, L2, and L3 used to create the composite label LS. The user can create a composite label LS using the plurality of sets of layer label data in composite label template data stored in the high-capacity storage device 46.

Further, user-created composite label data is also stored in the high-capacity storage device 46. Using the plurality of sets of layer label data configuring the user-created composite label data stored in the high-capacity storage device 46, the user can edit a composite label LS from scratch to produce a desired form.

After launching the print data editing program, in step S205 the CPU 41 acquires composite label template data corresponding to the desired composite label LS. Alternatively, in step S275 the CPU 41 acquires user-created composite label data corresponding to a desired composite label LS.

In steps S210 and S280, the CPU 41 displays on the display unit 44 a composite image IS formed by superimposing the acquired sets of layer label data. While viewing the displayed composite image IS, the user performs operations on the operating unit 43 for editing the composite image IS. In steps S235, S310 and S320, the CPU 41 edits one of the sets of layer label data based on the editing operations. In steps S235 and S305 through S325, the CPU 41 sets different allowable editing ranges depending on whether the composite label data is manufacturer-created composite label template data or user-created composite label data.

In the example of the present embodiment, the user performs editing operations while the composite image IS is displayed, and the composite image IS is configured of the plurality of sets of acquired layer label data superimposed on each other. Accordingly, the user can intuitively perform editing operations while viewing the final appearance of the superimposed label data. The allowable editing range differs when the user is editing a plurality of sets of layer label data in manufacturer-created composite label template data or is editing a composite label LS from scratch using user-created composite label data. According to the present embodiment, when editing is performed on a plurality of sets of layer label data in composite label template data, the user can edit the layer label data through a quick and simple process while making full use of editing based on a template by limiting editing according to predetermined settings for composite label template data, for example.

One feature of the present embodiment is that in steps S305 through S320 the user can increase or decrease the number of layers, i.e., the number of sets of data that can be used in editing for riser-created or blank composite label data but cannot modify the number of layers in composite label template data. By prohibiting the user from changing the number of preset layers in template data when editing is performed based on a plurality of sets of layer label data in composite label template data, the present embodiment enables image data to be edited through a quick and simple process while making full use of the benefits of editing from a template.

<Variations of the Embodiments>

While the description has been made in detail with reference to specific embodiments, it would be apparent to those skilled in the art that many modifications and variations may be made thereto. Next, a series of variations of the embodiments will be described, wherein like parts and components with the embodiments are designated with the same reference numerals to avoid duplicating description.

In the above descriptions, the use of composite label data previously created h the user and blank label data for creating new composite label data was applied to the fourth embodiment that uses the operation terminal 4 for editing. However, use of this data may also be applied to the first embodiment in which the mobile terminal 3 or label printer 2 is used for editing, or to the second or third embodiment described above. Further, editing that involves increasing or decreasing the number of layers is restricted when using sets of layer label data configuring composite label template data, but the present disclosure is not limited to this method. For example, the editing program may allow the modification of cassette data in the auxiliary window 72 in all of the first through fourth embodiments while preventing the modification of cassette data when using a plurality of sets of layer label data in composite label template data.

Further, the flowcharts shown in FIGS. 11, 15, 18, 20, and 21 do not limit the present disclosure to the steps indicated therein. Steps may be added or deleted, or their order may be rearranged, without departing from the spirit and technical ideas of the disclosure. For example, the process in FIG. 18 may advance to S245 after the completion of S225 and contrast may be restored if an operation has not been performed within the fixed interval.

The CPU 31 of the mobile terminal 3 may also be configured to receive edit object operations in the composite image display region GM in the first embodiment. When edit object operations are accepted in the composite image display region GM, the layer image display region LM may be eliminated. Further, the composite image IS may be displayed so that the layer image including the object being edited is emphasized relative to other layer images. Further, when composite label data previously created by the user is being edited in place of the composite label template data in the first and second embodiments, the CPU 31 may be configured to receive a select layer operation on the composite image displayed on the display unit and may edit the object in the selected layer.

In addition to what has already been described, the methods according to the embodiments and their variations described above may be used in suitable combinations.

In addition, although not illustrated individually, the present disclosure may be implemented with various modifications, without departing from the spirit of the disclosure.

What is claimed is:

1. A non-transitory computer-readable storage medium storing a set of computer-readable instructions for an information processing device, the information processing device including: a display; an operating interface; and a processor, the set of computer-readable instructions, when executed by the processor, causing the information processing device to perform:
   (a) acquiring, from a memory configured to store a plurality of sets of template data, a single set of template data for a single composite label selected from among the plurality of sets of template data, the single set of template data including a plurality of sets of image data,
      each set of image data, of the plurality of sets of image data, corresponding to a respective one of a plurality of print labels, and each set of the image data representing a respective one of a plurality of label images, the single composite label being to be created using the plurality of print labels;
   (b) displaying on the display a composite label image in which the plurality of label images is superimposed on each other;
   (c) receiving a designating operation on the composite label image via the operating interface, the designating operation targeting a target label image, the target label image being one of the plurality of label images; and
   (d) identifying target image data corresponding to the target label image from among the plurality of sets of image data.

2. The non-transitory computer-readable storage medium according to claim 1,
   wherein the (b) displaying further displays on the display the target label image represented by the target image data identified in (d).

3. The non-transitory computer-readable storage medium according to claim 2,
   wherein the set of computer-readable instructions, when executed by the processor, causes the information processing device to further perform:
   (e) receiving an editing operation on the target label image via the operation interface;
   (f) updating, in response to receiving the editing operation in (e), the target label image displayed on the display; and
   (g) updating, in response to receiving the editing operation in (e), the composite label image displayed on the display.

4. The non-transitory computer-readable storage medium according to claim 1,
   wherein the (b) displaying displays the plurality of label images together with the composite label image,
   wherein the set of computer-readable instructions, when executed by the processor, causes the information processing device to further perform:
   (h) receiving an editing operation on the composite label image via the operation interface;
   (i) updating, in response to receiving the editing operation in (h), the composite label image displayed on the display; and
   (j) updating, in response to receiving the editing operation in (h), the target label image among the plurality of label images displayed on the display.

5. The non-transitory computer-readable storage medium according to claim 4,
   wherein the (b) displaying emphasizes the target label image displayed on the display relative to the plurality of label images other than the target label image in response to identifying the target image data in (d).

6. The non-transitory computer-readable storage medium according to claim 1,
   wherein each set of the plurality of sets of image data acquired in (a) is associated with a respective one of a plurality of print medium types, each of the plurality of print medium types indicating a type of a print medium to be used for creating corresponding one of the plurality of print labels, and
   wherein the (b) displaying further displays the plurality of print medium types on the display.

7. The non-transitory computer-readable storage medium according to claim 6,
   wherein the set of computer-readable instructions, when executed by the processor, causes the information processing device to further perform:
   (k) receiving a change operation instructing to change one of the plurality of print medium types to another print medium type, and wherein the (b) displaying displays a modified composite label image in which one of the plurality of label images corresponding to the one of the plurality of print medium types is modified in accordance with a color corresponding to the another print medium type.

8. The non-transitory computer-readable storage medium according to claim 1,
   wherein the set of computer-readable instructions, when executed by the processor, causes the information processing device to further perform:
   (1) outputting, in response to receiving a printing operation related to the composite label image, to a printer a plurality of print jobs, and each of such print jobs corresponding to a respective one of the plurality of sets of image data.

9. A non-transitory computer-readable storage medium storing a set of computer-readable instructions for an information processing device, the information processing device including: a display; an operating interface; and a processor, the set of computer-readable instructions, when executed by the processor, causing the information processing device to perform:
  (a) acquiring, from a first memory configured to store a plurality of sets of template data, a single set of template data for a first composite label selected from among the plurality of sets of template data, the single set of template data including a plurality of sets of first image data,
    each set of first image data, of the plurality of sets of first image data, corresponding to a respective one of a plurality of first print labels, and each set of the first image data representing a respective one of a plurality of first label images, the first composite label being to be created using the plurality of first print labels;
  (b) acquiring, from a second memory configured to store editable data, the editable data for a second composite label, the editable data including a plurality of sets of second image data,
    each set of second image data, of the plurality of sets of second image data, corresponding to a respective one of a plurality of second print labels, and each set of the second image data representing a respective one of a plurality of second label images, the second composite label being to be created using the plurality of second print labels;
  (c) displaying on the display a composite label image in which a plurality of label images is superimposed on each other, and each of the plurality of label images corresponding to a respective one of a plurality of print labels used for creating a composite label, the composite label image being a selected one of a first composite label image in which the plurality of first label images is superimposed on each other and a second composite label image in which the plurality of second print label images is superimposed on each other;
  (d) receiving an editing operation related to the composite label image via the operating interface; and
  (e) editing, in response to receiving the editing operation in (d), a plurality of sets of image data within an allowable editing range, and each set of the plurality of sets of image data representing a respective one of the plurality of label images and having the allowable editing range, the plurality of sets of first image data having a first allowable editing range, the plurality of sets of second image data having a second allowable editing range different from the first allowable editing range.

10. The non-transitory computer-readable storage medium according to claim 9,
  wherein in the first allowable editing range, the (e) editing is not allowed to change a number of the plurality of sets of first image data, and
  wherein in the second allowable editing range, the (e) editing is allowed to change a number of the plurality of sets of second image data.

11. The non-transitory computer-readable storage medium according to claim 9, wherein each set of the plurality of sets of first image data acquired in (a) is associated with a respective one of a plurality of first print medium types, each of the plurality of first print medium types indicating a type of a first print medium to be used for creating corresponding one of the plurality of first print labels,
  wherein each set of the plurality of sets of second image data acquired in (b) is associated with a respective one of a plurality of second print medium types, each of the plurality of second print medium types indicating a type of a second print medium to be used for creating corresponding one of the plurality of second print labels, and
  wherein the (c) displaying displays on the display a plurality of print medium types associated with the plurality of sets of image data, each of the plurality of print medium types indicating a type of a print medium to be used for creating corresponding one of the plurality of print labels.

12. The non-transitory computer-readable storage medium according to claim 11,
  wherein the (d) receiving receives the editing operation instructing to change one of the plurality of print medium types to another print medium type, and
  wherein the (c) displaying displays a modified composite label image in which one of the plurality of label images corresponding to the one of the plurality of print medium types is modified in accordance with a color corresponding to the another print medium type.

13. The non-transitory computer-readable storage medium according to claim 9,
  wherein the set of computer-readable instructions, when executed by the processor, causes the information processing device to further perform:
  (1) outputting, in response to receiving a printing operation related to the composite label image, to a printer a plurality of print jobs, and each of such print jobs corresponding to a respective one of the plurality of sets of image data.

14. An information processing device comprising:
a display;
an operating interface; and
a processor configured to perform:
  (a) acquiring, from a memory configured to store a plurality of sets of template data, a single set of template data for a single composite label selected from among the plurality of sets of template data, the single set of template data including a plurality of sets of image data,
    each set of image data, of the plurality of sets of image data, corresponding to a respective one of a plurality of print labels, and each set of the image data representing a respective one of a plurality of label images, the single composite label being to be created using the plurality of print labels;
  (b) displaying on the display a composite label image in which the plurality of label images is superimposed on each other;
  (c) receiving a designating operation on the composite label image via the operating interface, the designating operation targeting a target label image, the target label image being one of the plurality of label images; and
  (d) identifying target image data corresponding to the target label image from among the plurality of sets of image data.

15. An information processing device comprising:
a display;

an operating interface; and
a processor configured to perform:
(a) acquiring, from a first memory configured to store a plurality of sets of template data, a single set of template data for a first composite label selected from among the plurality of sets of template data, the single set of template data including a plurality of sets of first image data,
each set of first image data, of the plurality of sets of first image data, corresponding to a respective one of a plurality of first print labels, and each set of the first image data representing a respective one of a plurality of first label images, the first composite label being to be created using the plurality of first print labels;
(b) acquiring, from a second memory configured to store editable data, the editable data for a second composite label, the editable data including a plurality of sets of second image data,
each set of second image data, of the plurality of sets of second image data corresponding to a respective one of a plurality of second print labels, and each set of second image data representing a respective one of a plurality of second label images, the second composite label being to be created using the plurality of second print labels;
(c) displaying on the display a composite label image in which a plurality of label images is superimposed on each other, the plurality of label images corresponding to a respective one of a plurality of print labels used for creating a composite label, the composite label image being a selected one of a first composite label image in which the plurality of first label images is superimposed on each other and a second composite label image in which the plurality of second print label images is superimposed on each other;
(d) receiving an editing operation related to the composite label image via the operating interface; and
(e) editing, in response to receiving the editing operation in (d), a plurality of sets of image data within an allowable editing range, and each set of the plurality of sets of image data representing a respective one of the plurality of label images and having the allowable editing range, the plurality of sets of first image data having a first allowable editing range, the plurality of sets of second image data having a second allowable editing range different from the first allowable editing range.

16. A non-transitory computer-readable storage medium storing a set of computer-readable instructions for an information processing device, the information processing device including: a display; an operating interface; a memory; and a processor, the set of computer-readable instructions, when executed by the processor, causing the information processing device to perform:
(a) displaying on the display a composite label image in which a plurality of label images are superimposed on each other, the composite label image corresponding to a single composite label, the single composite label being to be created using a plurality of print labels, the plurality of label images corresponding to respective ones of the plurality of print labels;
(b) receiving a designating operation via the operating interface, the designating operation designating a target label image, the target label image being one of the plurality of label images; and in response to receiving the designating operation in (b),
(c) displaying on the display the target label image designated by the designating operation in (b) together with the composite label image displayed in (a).

17. The non-transitory computer-readable storage medium according to claim 16,
wherein the set of computer-readable instructions, when executed by the processor, causes the information processing device to further perform:
(d) receiving an editing operation on the target label image via the operation interface;
(e) updating, in response to receiving the editing operation in (d), the target label image displayed on the display; and
(f) updating, in response to receiving the editing operation in (d), the composite label image displayed on the display.

18. The non-transitory computer-readable storage medium according to claim 16,
wherein the (c) displaying displays the plurality of label images together with the composite label image,
wherein the set of computer-readable instructions, when executed by the processor, causes the information processing device to further perform:
(g) receiving an editing operation on the composite label image via the operation interface;
(h) updating, in response to receiving the editing operation in (g), the composite label image displayed on the display; and
(i) updating, in response to receiving the editing operation in (g), the target label image among the plurality of label images displayed on the display.

19. The non-transitory computer-readable storage medium according to claim 18,
wherein the (c) displaying emphasizes the target label image displayed on the display relative to the plurality of label images other than the target label image in response to receiving the designating operation in (b).

20. The non-transitory computer-readable storage medium according to claim 16,
wherein the plurality of label images are associated with respective ones of a plurality of print medium types, each of the plurality of print medium types indicating a type of a print medium to be used for creating corresponding one of the plurality of print labels, and
wherein the (a) displaying further displays the plurality of print medium types on the display.

21. The non-transitory computer-readable storage medium according to claim 20,
wherein the set of computer-readable instructions, when executed by the processor, causes the information processing device to further perform:
(j) receiving a change operation via the operation interface, the change operation instructing to change one of the plurality of print medium types to another print medium type, and
wherein the (a) displaying displays a modified composite label image in which one of the plurality of label images corresponding to the one of the plurality of print medium types is modified in accordance with a color corresponding to the another print medium type.

22. The non-transitory computer-readable storage medium according to claim 16,
wherein the set of computer-readable instructions, when executed by the processor, causes the information processing device to further perform:

(k) outputting, in response to receiving a printing operation related to the composite label image, to a printer a plurality of print jobs corresponding to respective ones of the plurality of print labels.

23. An information processing device comprising:
a display;
an operating interface;
a memory; and
a processor configured to perform:
- (a) displaying on the display a composite label image in which a plurality of label images are superimposed on each other, the composite label image corresponding to a single composite label, the single composite label being to be created using a plurality of print labels, the plurality of label images corresponding to respective ones of the plurality of print labels;
- (b) receiving a designating operation via the operating interface, the designating operation designating a target label image, the target label image being one of the plurality of label images; and
- in response to receiving the designating operation in (b), (c) displaying on the display the target label image designated by the designating operation in (b) together with the composite label image displayed in (a).

* * * * *